(12) United States Patent
Nikovski et al.

(10) Patent No.: US 11,673,264 B2
(45) Date of Patent: Jun. 13, 2023

(54) SYSTEM AND METHOD FOR ROBOTIC ASSEMBLY BASED ON ADAPTIVE COMPLIANCE

(71) Applicant: Mitsubishi Electric Research Laboratories, Inc., Cambridge, MA (US)

(72) Inventors: Daniel Nikolaev Nikovski, Brookline, MA (US); Diego Romeres, Boston, MA (US); Devesh Jha, Cambridge, MA (US); William Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 266 days.

(21) Appl. No.: 17/212,155

(22) Filed: Mar. 25, 2021

(65) Prior Publication Data

US 2022/0305645 A1    Sep. 29, 2022

(51) Int. Cl.
*B25J 9/16*       (2006.01)
*G06N 20/00*   (2019.01)
(Continued)

(52) U.S. Cl.
CPC ............ *B25J 9/163* (2013.01); *B25J 9/1633* (2013.01); *B25J 9/1648* (2013.01); *B25J 9/1664* (2013.01);
(Continued)

(58) Field of Classification Search
CPC ........ B25J 9/163; B25J 9/1633; B25J 9/1648; B25J 9/1664; B25J 9/1687; B25J 9/1697;
(Continued)

(56) References Cited

U.S. PATENT DOCUMENTS 9,636,827 B2    5/2017  Sato
9,981,382 B1    5/2018  Strauss et al.
(Continued)

FOREIGN PATENT DOCUMENTS

CN    111037560 A  *  4/2020  ............ B25J 9/1605
JP    4587061 B2   *  11/2010  ............ B23P 19/02

OTHER PUBLICATIONS

Nemec et. al., "Transferor Assembly Operations to New Workpiece Poses by Adaptation to the Desired Force Profile" 2013, IEEE pp. 1-7.*

(Continued)

*Primary Examiner* — Adam R Mott
*Assistant Examiner* — Sagar Kc
(74) *Attorney, Agent, or Firm* — Gennadiy Vinokur; Hironori Tsukamoto

(57) ABSTRACT

A robot for performing an assembly operation is provided. The robot comprises a processor configured to determine a control law for controlling a plurality of motors of the robot to move a robotic arm according to an original trajectory, execute a self-exploration program to produce training data indicative of a space of the original trajectory, and learn, using the training data, a non-linear compliant control law including a non-linear mapping that maps measurements of a force sensor of the robot to a direction of corrections to the original trajectory defining the control law. The processor transforms the original trajectory according to a new goal pose to produce a transformed trajectory, update the control law according to the transformed trajectory to produce the updated control law, and command the plurality of motors to control the robotic arm according to the updated control law corrected with the compliance control law.

11 Claims, 14 Drawing Sheets

(51) Int. Cl.
*B25J 13/08* (2006.01)
*G05B 13/02* (2006.01)

(52) U.S. Cl.
CPC .......... *B25J 9/1687* (2013.01); *B25J 9/1697* (2013.01); *B25J 13/08* (2013.01); *B25J 13/085* (2013.01); *G05B 13/0265* (2013.01); *G06N 20/00* (2019.01)

(58) Field of Classification Search
CPC ..... B25J 13/08; B25J 13/085; G05B 13/0265; G05B 2219/39319; G05B 2219/39323; G05B 2219/39342; G05B 2219/40032; G05B 2219/40033; G06N 20/00
See application file for complete search history.

(56) References Cited

U.S. PATENT DOCUMENTS

| | | | |
|---|---|---|---|
| 2006/0178778 A1* | 8/2006 | Fuhlbrigge | G05B 19/0426 700/264 |
| 2010/0057256 A1 | 3/2010 | Sato et al. | |
| 2016/0089788 A1* | 3/2016 | Nammoto | B25J 9/1633 700/250 |
| 2017/0348856 A1 | 12/2017 | Nakaya et al. | |
| 2018/0361575 A1 | 12/2018 | Oumi | |
| 2019/0248006 A1* | 8/2019 | Takahashi | G05B 19/421 |
| 2020/0230815 A1* | 7/2020 | Nikovski | B25J 9/1687 |

OTHER PUBLICATIONS

Jankovics, V., Mátéfi-Tempfli, S., Manoonpong, P. (2016). Artificial Neural Network Based Compliant Control for Robot Arms. In: Tuci, E., Giagkos, A., Wilson, M., Hallam, J. (eds) From Animals to Animats 14. SAB 2016. Lecture Notes in Computer Science( ), vol. 9825. Springer, Cham. https://doi.org/10.1007/978-3-319-43488-9_9.

FJ Abu Dakka et al. Adaptation of Manipulation skills in physical contact with the environment to reference force profiles. XP03558835.

* cited by examiner

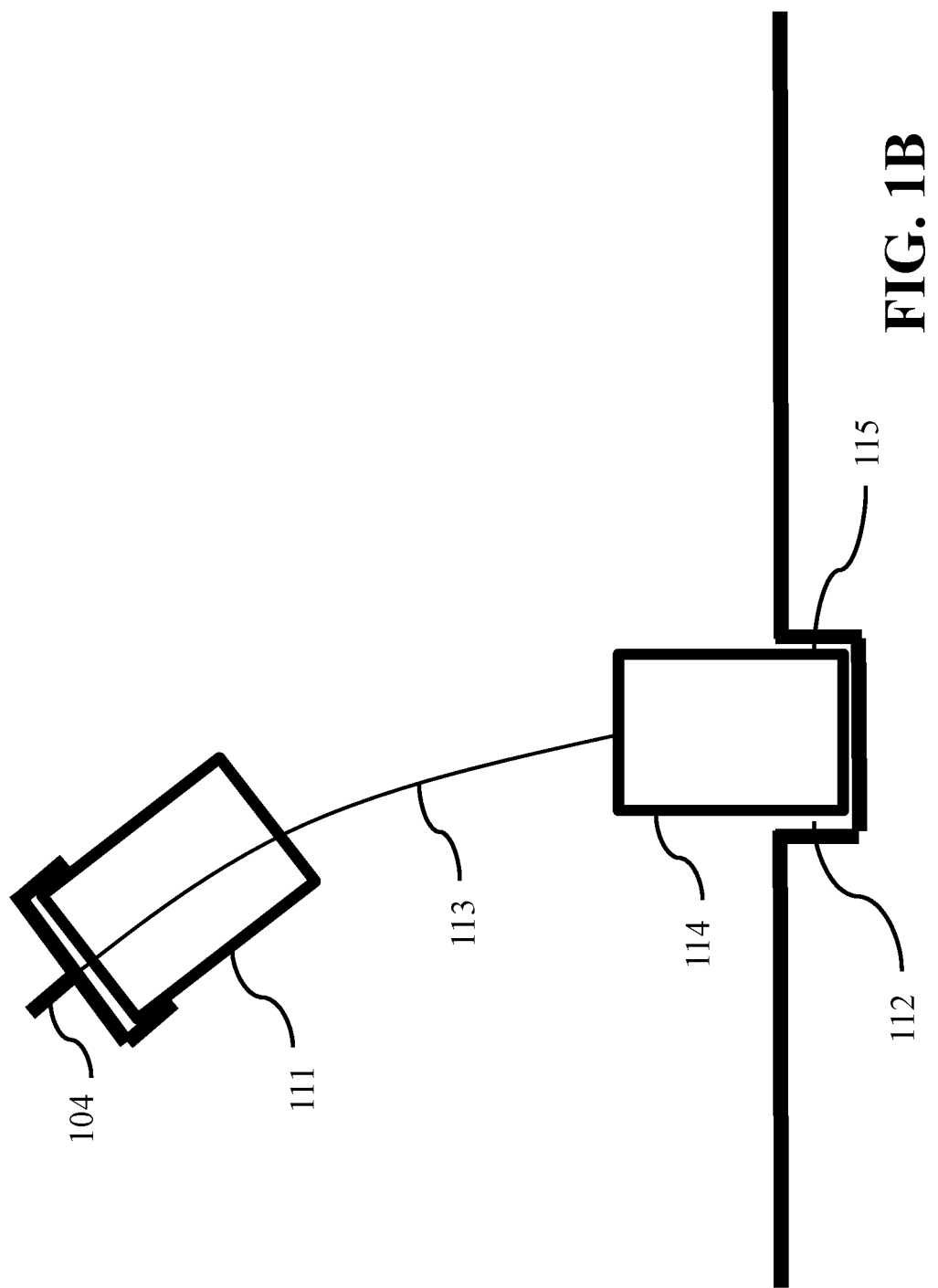

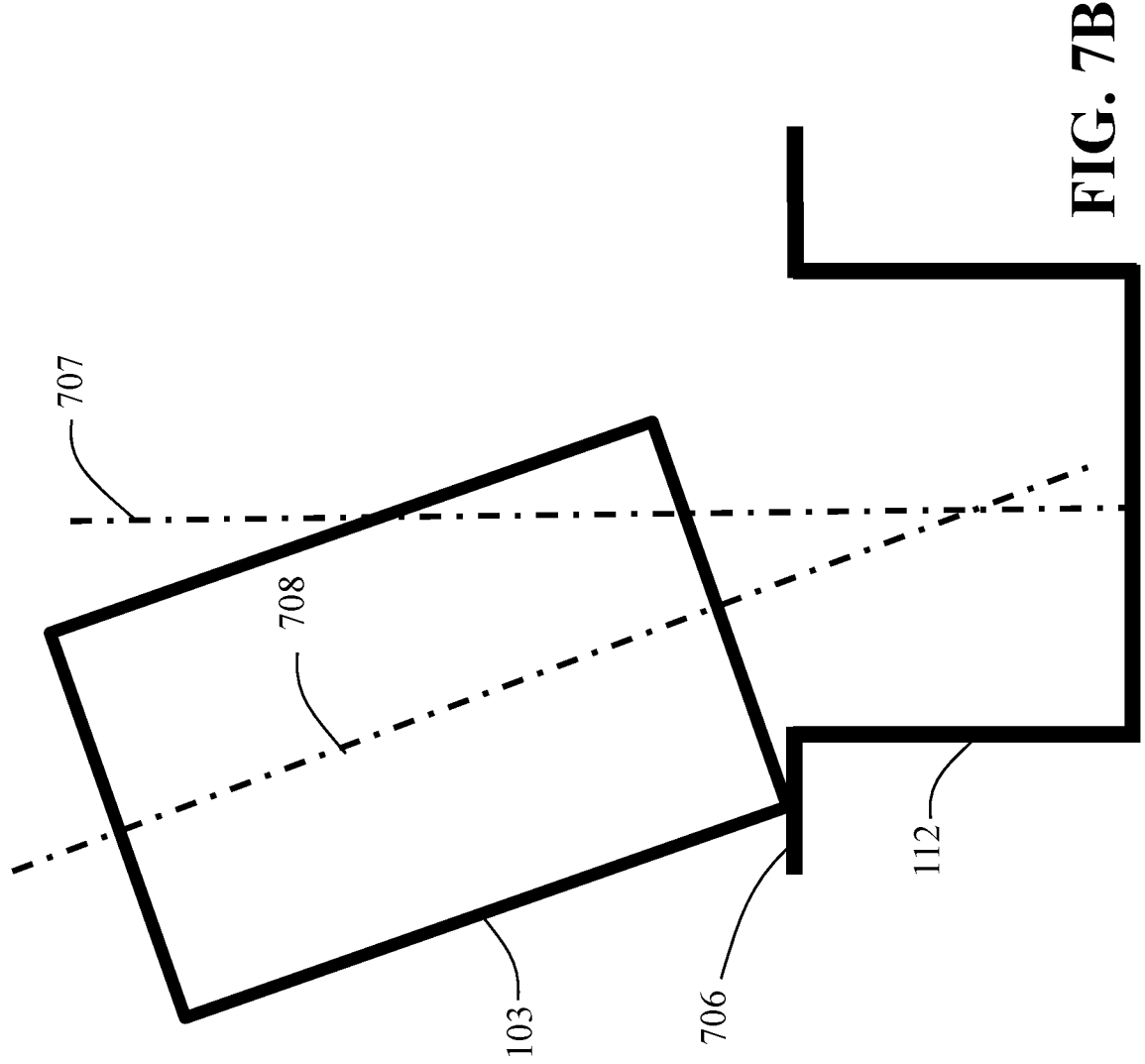

SYSTEM AND METHOD FOR ROBOTIC ASSEMBLY BASED ON ADAPTIVE COMPLIANCE

TECHNICAL FIELD

The present disclosure relates generally to a robotic assembly, and more specifically to a robotic assembly based on adaptive compliance providing corrective measures.

BACKGROUND

Various types of robotic devices are developed for performing a variety of operations such as material handling, transportation, welding, assembly, and the like. The assembly operation may correspond to connecting, coupling, or positioning a pair of parts in a particular configuration. The robotic devices include various components that are designed to aid the robotic devices in interacting with an environment and performing the operations. Such components may include robotic arms, actuators, end-effectors, and various other robotic manipulators.

Generally, in a robotic assembly operation, the parts are placed together or assembled by means of one or more robot aims. For example, Cartesian and SCARA robots with three or four degrees of freedom (DoF) are used for such operation, however, these robots have limitations on allowed positions of the parts. In industrial uses, strict repeatability of position and/or the orientation of the parts are assumed, so that open-loop programs can be executed easily and correctly. Under such assumption, a fixed sequence of operations to be performed by the robot devices can be taught to it by a human operator by means of a teaching pendant. The teaching pendant stores coordinates of via points in the robot's memory, and the via points can be traversed at run time without any modification. In many cases, no further programming of the robot devices is needed.

However, complication arises when the positions of the parts involved in the operation varies between repetitions of the assembly operation. This can happen in a case where the parts are deposited onto a surface by a feeder, and each time end up in a different position; also, in a case where the parts arrive on a moving conveyor belt. In such cases, industrial vision cameras can be used to determine the parts' position. However, the determined position of the parts by the industrial vision cameras is usually inaccurate. In other words, the determined position of the parts by the industrial vision camera is not accurate enough for the assembling operations during various industrial robotic applications.

Besides, even if the robotic device knows the exact position of the parts, its path (as defined by the via points) still needs to be modified in order to accommodate the variation in the position of the parts. In practice, such a modification is performed by means of a dedicated computer program that takes as input the changed position of the parts and outputs a new path for the robot. However, developing such a dedicated computer program is typically very difficult and laborious, and is currently one of main components of high cost of deploying and re-tooling the robotic devices for a new assembly operation.

Therefore, there is a need for a system for accurate execution of different assembly operations with variable positions of the parts to be assembled without operation-specific programming.

SUMMARY

It is an objective of some embodiments to provide a method for learning an adaptive assembly strategy (AAS) for a wide variety of tasks from both human demonstrations as well as self-experimentation by a robot itself, which reduces or avoids task-specific robot programming Additionally or alternatively, it is another object of some embodiments to provide such a learned AAS that adapts to variations in one or combination of a starting as well as the end pose of the robot needed for a successful completion of an assembly operation.

Additionally or alternatively, it is another object of some embodiments to provide such a learned AAS that can adapt to modifications of the start and/or goal pose, even when the poses are not precisely known. As used herein, the poses are not precisely known when the accuracy of measurements or estimations of the pose is less than the accuracy required for the assembly operation. Hence, it is another object of some embodiments to provide AAS suitable for an end-pose modification including a change in at least one or combination of a new start pose of a wrist of a robotic arm and a new goal pose of the wrist measured by measurement devices with an accuracy less than the tolerance of the assembly operation.

To overcome this limitation of the measurement devices, robots are equipped with an additional force/torque sensor, mounted on the wrist of the robot or under a platform holding the immovable parts used in the assembly. For example, it is an objective of one embodiment to control the robot to follow a trajectory for the robot's end-tool modified by both the goal pose and possible forces due to contacts encountered along the trajectory. In such a manner, the forces can be used to correct the inaccuracy of pose estimation.

Without loss of generality, some embodiments read on a following example. Let the goal pose of the end-tool, e.g., a gripper, be implicitly determined by placement of an immobile object A that is affixed to a work surface. The robot is holding in its gripper a second object B, and an objective of the assembly operation is to put the two objects together, typically in close contact, for example inserting the object B into the object A. At the end of a successful execution of the assembly operation, the pose of the end tool is considered to have assumed the goal pose. From this definition, achieving the goal pose of the end tool is equivalent to a successful execution of the assembly operation, for a given location of the immobile object A. In addition, for different execution of such assembly operation, one or combination of the objects A and B are located in a new and different pose. This can happen, for example, when the objects are deposited onto a surface by a feeder, and each time end up in a different pose; also, when the object A arrives on a moving conveyor belt. In such cases, various measurement devices, such as vision cameras, can be used to determine the pose of the objects A and B. However, the accuracy of measurements provided by such devices is less than an accuracy (tolerance) prescribed by the assembly operation.

Some embodiments are based on understanding that it is possible to design an original trajectory of a motion of the gripper that performs the assembly operation of the objects A and B. Examples of such a trajectory include one or combination of pose of the gripper as a function of time and velocity of the gripper as a function of time. Example of a control law to track the trajectory is $\dot{y}(t)=\dot{y}_d(t)$, where $\dot{y}_d(t)$ is a velocity (relative change in position per unit time step) that is needed to achieve a desired trajectory $y_d(t)$, and $\dot{y}(t)$ is actual velocity realized by a low-level robot controller. However, it is not always possible to control the gripper along the original trajectory precisely due to imperfection of control devices of the robot and the measurement devices of the robot. For example, practically all industrial robot controllers produce small errors while following the desired trajectory.

To that end, some embodiments are based on the recognition that the control law can be combined with a compliant control law to adjust the imperfections of the control devices of the robot and the measurement devices of the robot. In such situations, the measurements of the force can be used by an actuator to move the gripper linearly in a direction opposite to the direction of the force. Here, the example of the control law is $\dot{y}(t)=\dot{y}_d(t)+K\tau$, where $\tau$ are the forces measured by the force sensor, and K is a linear diagonal matrix with predetermined values that depend on how compliant the gripper needs to be with respect to encountered obstacles. However, some embodiments are based on understanding that such a linear compliant control law is insufficient in situations when the inaccuracy of the measurements devices is greater than the accuracy of the assembly operation. For example, in a scenario of inserting a peg into a hole, if the peg experiences a vertical force due to colliding with the edge of the hole, a stiffness control law with a diagonal matrix K cannot generate a horizontal motion towards a center of the hole. For such cases, an active interpretation of the forces measured and generation of corrective motions based on the forces measured is needed.

To that end, some embodiments modify the linear compliant control with a non-linear compliant controller that maps the robot's experienced forces onto pose and velocity changes in a non-linear manner. In this example, the control law is of form $\dot{y}(t)=\dot{y}_d(t)+H(\tau)$, where H is a non-linear mapping that produces corrections to a velocity of the robot. Some embodiments are based on understanding that such a control law combining a trajectory with non-linear compliant controller can be determined for a specific assembly operation along a specific trajectory and repeated any number of times for the same assembly operation by robots of the same type. However, when the start or the goal pose of the assembly operation changes, the control law should be modified accordingly, which is challenging without additional learning. In other words, it is an objective of some embodiments to transform, in response to the change of the start and/or goal poses of the robotic assembly operation, the original control law $\dot{y}(t)=\dot{y}_d(t)+H(\tau)$ learned for the original trajectory of the robotic assembly operation into $\dot{y}(t)=\dot{y}_{dnew}(t)+H_{new}(\tau)$, for the control according to a transformed trajectory $\dot{y}_{dnew}(t)$ and force mapping $H_{new}(\tau)$.

Some embodiments are based on understanding that for a number of practical applications, the original trajectory can be transformed into the transformed trajectory connecting new start and goal poses using an affine mapping of the original trajectory. For example, the original trajectory can be represented by Dynamic Movement Primitives (DMP). DMPs are sets of parametrized ordinary differential equations (ODE) that can generate a trajectory that brings a system, such as a robot, from the start pose to the goal pose. The DMPs can easily adapt the trajectory according to new starting as well as goal states, thus constituting essentially a closed-loop controller. Also, the DMPs can be learned from a limited number of training examples, including even a single one. Hence, it is possible to modify the original trajectory in response to the change of the start and goal pose.

However, adaptation of the non-linear mapping learned for the original trajectory to the modified trajectory is challenging and may not even be possible in online setting of the assembly operation. Some embodiments are based on realization that if the original trajectory is modified according to changes into a start and/or goal poses, the non-linear mapping learned for the original trajectory is valid for the transformed trajectory without any additional adaptation. Such realization can be explained by the nature of the forces arising due to contact between the objects. A sign and magnitude of the forces depends entirely on a relative position of the two objects, and not on their absolute position in space. To that end, if one of the objects is moved to a new location (undergoes an affine rigid body transformation of its coordinates), and the other object approaches it along a similarly transformed trajectory, the same forces may arise.

Accordingly, such recognition allows some embodiments to determine a control law offline such that this offline control law is suitable for online adaptations. Specifically, some embodiments determine offline the original trajectory and the non-linear mapping for the original trajectory, and modify online, i.e., during the assembly operation, the original trajectory to accommodate new start or goal poses and to control the robot according to the transformed trajectory and the non-linear mapping learned for the original trajectory. In this case, the control law is $\dot{y}(t)=\dot{y}_{dnew}(t)+H(\tau)$. In such a manner, various embodiments can accommodate changes in the start and/or goal poses measured with the measurement devices having precisions less than the precision of the assembly operation.

It is an objective of some embodiments to provide such a control law with minimum task-specific robot programming Some embodiments are based on understanding that a DMP for the original trajectory can be learned through demonstrations. For example, under assumption of fixed location of objects for the original trajectory, a fixed sequence of the operations to be performed by the robot can be taught to it by a human operator by means of a teaching pendant or a joystick with appropriate number of degrees of freedom that stores the coordinates of via points in the robot's memory, and the via points can be traversed at run time without any modification. A DMP can be generated (learned) from these via points without any further programming of the robot, resulting in relatively fast and inexpensive deployment. However, there is also a need to determine the non-linear force mapping $H(\tau)$ with minimal human involvement.

For example, some embodiments learn the non-linear mapping of the controller via machine learning, e.g., a deep learning. In such a manner, where there is a need to deploy new assembly adaptable to new start or end poses measured with insufficient accuracy, the trajectory can be determined via human demonstration, while the non-linear mapping can be learned through training implemented by means of a self-exploration program, thereby minimizing human involvement.

The non-linear mapping $H(\tau)$ can be learned by means of self-experimentation while the immobile object A is still in its original pose, for which a human operator has specified at least one trajectory $y_d(t)$ that completes the assembly operation successfully. The robot repeatedly follows the trajectory $y_d(t)$ by following an associated velocity profile $\dot{y}_d(t)$, while intentionally introducing random variations to it that result in displacements $d(t)$ from the original trajectory. If contact forces $\tau_k=\tau(t_k)$ at time $t_k$ are registered, when the trajectory was varied by $d_k=d(t_k)$, then the forces $\tau_k$ can be used to infer the displacement $d_k$ from the correct trajectory, under certain conditions.

Some embodiments are based on recognition that the original trajectory $y_d(t)$ demonstrated by the human demonstrator can be assumed to be safe and collision-free, relying on ability of the demonstrator to ensure safety while guiding the robot during the demonstration, the same is not true for modified trajectory $y_d(t)+d(t)$ that is deliberately perturbed from the original safe trajectory $y_d(t)$. Some embodiments are based on further recognition that the objects to be assembled may collide or jam when the modified trajectory $y_d(t)+d(t)$ is followed instead of the original trajectory $y_d(t)$. Thus, some embodiments are based on objective of traversing the modified trajectory $y_d(t)+d(t)$ in a safe manner that does not damage the robot or the objects being assembled.

In some embodiments, the robot equipped with the force sensor includes safeguards that turn off the robot when the sensed forces exceed a threshold, so that the robot is protected from damage due to the collision. However, when the objects being assembled are delicate parts (e.g., electronic parts), the threshold may be high to protect the objects being assembled. Some embodiments are based on realization that the modified trajectory can be safely executed by using a compliant controller that reacts to the experienced forces and acts to minimize the experienced forces. For example, a linear compliant law $\dot{y}(t)=\dot{y}_d(t)+K\tau$ with a diagonal matrix K can be used.

In an embodiment, entries of the diagonal matrix can be determined based on the maximum force that is safe to apply in a particular direction. For example, if the maximum force is $f_{zmax}$ along z direction/axis, and the maximum velocity along z direction is $$\dot{y}_{dzmax} = \max_t |\dot{y}_{dz}(t)|,$$

where a desired velocity along z direction is $\dot{y}_{dz}(t)$, then a value for an element $k_z$ of the diagonal matrix K can be $k_z=\dot{y}_{dzmax}/f_{zmax}$. Such element of the diagonal matrix K ensures that in case of obstruction along the z direction, when magnitude of the desired velocity $\dot{y}_{dz}(t)$ along the z direction always obeys $|\dot{y}_{dz}(t)| \leq \dot{y}_{dzmax}$, a correction $k_z f_z(t)$ due to the force $f_z(t)$ experienced along z direction (normally negative, if the desired velocity $\dot{y}_{dz}(t)$ is positive, and vice versa) may stop the robot 150, that is, $0=\dot{y}_z(t)=\dot{y}_{dz}(t)+k_z f_z(t)$, with $|f_z(t)| \leq f_{zmax}$, as desired. Here, $f_z$ is a component of vector $\tau(t)$ corresponding to the force sensed along the z direction, and remaining entries of the diagonal matrix K corresponding to other two linear contact forces (along x and y), as well as three moments around the axes, can be determined similarly.

According to an embodiment, execution of the linear compliant law $\dot{y}(t)=\dot{y}_d(t)+K\tau$ on a robotic arm of the robot can be implemented by providing a series of commanded target positions $y_{c,k} \stackrel{\text{def}}{=} y_c(t_k)$ at discrete moments in time $t_k=k\Delta t$, where $\Delta t$ is a control step, to a compliant (impedance or admittance) controller with stiffness matrix K. To compute the commanded target positions $y_{c,k}$ an initial commanded position is computed. The initial commanded position is given as $y_{c,0}=y_d(0)$, that is, it coincides with an initial position from the original trajectory $y_d(t)$. Further, at each subsequent control step k, an actual realized position of the robot (or an end-tool of the robot) $y_{r,k}=y(t_k)$ is measured. Further, the commanded target position $y_{c,k+1}$ for a next control step is computed as $y_{c,k+1}=y_{r,k}+\dot{y}_d(t_k)\Delta t+\Delta y_k$. Here, $\Delta y_k$ is the variation/displacement introduced to the original trajectory $y_d(t)$ at time step k. By using $y_{r,k}$ instead of $y_{c,k}$ in the computation of $y_{c,k+1}$, the robot follows the velocity profile $\dot{y}_d(t_k)$, instead of an implied position profile (trajectory) $y_d(t_k)$. This ensures that when motion of the robot is stopped due to a collision, an error between a real and the commanded target position does not accumulate with advance of time. Instead, if $y_{r,k}$ remains constant due to obstruction, collision, or jamming, each new commanded position $y_{c,k+1}$ is only a small relative displacement $\dot{y}_d(t_k)\Delta t$ from $y_{r,k}$, and not achieving the displacement $\dot{y}_d(t_k)\Delta t$ can be tolerated by the compliant controller without reaching excessive contact forces, according to the diagonal matrix K that specifies a degree of motion compliance.

During the execution of the linear compliant law $\dot{y}(t)=\dot{y}_d(t)+K\tau$, a time series of the measured position $y_{r,k}$ indicates where the robot actually was at each control step. By comparing the measured position $y_{r,k}$ with where the robot (or the end-tool) was supposed to be according to the original trajectory $y_d(t)$, the displacement at each control step is computed as $d_k=d(t_k)=y(t_k)-y_d(t_k)=y_{r,k}-y_d(t_k)$.

The self-experimentation as described above can be followed multiple times, each time starting from the same initial position as in the original trajectory $y_d(t)$, and applying different displacements at various points in time. The displacements can be systematic, for example, introducing only one displacement at a single moment in time when the robot is still in free space, before contact between the objects has occurred, and in a plane perpendicular to the motion of the robot at that moment. Such displacements result in a modified trajectory at a constant offset from the original trajectory $y_d(t)$. In some embodiments, the displacements can also be random, that is, implemented by adding a small random variation at each moment, sampled from a probability distribution, for example Gaussian distribution.

As a result of multiple traversals of the original trajectory $y_d(t)$ with different displacements, data that relates direction and magnitude of the displacements with the forces experienced as a result is collected. When the robot is moving in free space, without contact, the displacement with respect to the original trajectory $y_d(t)$ cannot be inferred from contact forces, as the force experienced is zero. Therefore, moments in time at which $\tau_k=0$ are discarded. For each remaining case, that is, when $\tau_k \neq 0$, a training example in a form of a pair $(\tau_i, d_i)$ is added to a database of training examples, with $\tau_i=\tau_k$ and $d_i=d_k$, where i is an index of the pair in the database.

When a sufficient number N of training examples are collected, a supervised machine learning algorithm can be used to learn the mapping between forces and displacements that caused them. However, because the mapping from the displacements to the forces is typically many-to-one (multiple displacements may sometimes result in a same force), an inverse mapping may be one-to-many, that is, not a function that can be learned by means of machine learning. Such an ambiguity of the mapping challenges a possibility of learning the non-linear compliant controller.

However, some embodiments are based on the realization that the exact magnitude of the displacement does not need to be recovered for successful corrective action, and furthermore, multiple displacements can generate the same forces only if the sign of the multiple displacements is the same, as long as the magnitude of the displacement does not exceed a radius R of the object B being inserted. Based on this realization, a supervised machine learning algorithm is used to learn the mapping $\text{sign}(d_i)=H_0(\tau_i)$, for all examples i=1, N such that $\|d_i\| \leq R$, where $\|d_i\|$ is the $L_2$ norm of the displacement $d_i$. When the radius of the inserted object B is known, it can be provided to the supervised machine learning algorithm. When it is not, it can be found by searching for the largest value of R that results in a good fit on the training examples with the limitation $\|d_i\| \leq R$ on the magnitude of the displacement. Therefore, a non-linear mapping that maps the measurements of the force sensor to a direction of corrections to the original trajectory is learned. After the mapping $H_o(\tau)$ is learned, a desired mapping $H(\tau)$ can be obtained by scaling it by a suitable velocity constant $v_0$:$H(\tau)=v_o H_o(\tau)$, wherein the value of $v_0$ is predetermined by an application designer. In some implementations, the value of $v_0$ does not exceed a value determined based on the radius R of the object B that is being inserted. For example, the velocity and the radius have different measurement units, m vs. m/s, making the direct comparison impractical or at least inconvenient. Hence, some embodiments compare the radius R with the distance v0*dt travelled each control step, where dt is the duration of the control step, and making sure that v0*dt<R, so that the movement does not overshoot the hole.

Accordingly, one embodiment discloses a robot, comprising a robotic arm including a wrist having a motion with multiple degrees of freedom, wherein during an operation of the robot a force sensor is arranged to produce measurements indicative of force experienced by an end-tool of the robotic arm during the operation; a plurality of motors configured to change a motion of the robotic arm according to a command produced according to a control law; at least one processor; and memory having instructions stored thereon that, when executed by the at least one processor, cause the processor, upon receiving data indicative of an original trajectory for the motion of the robotic arm transitioning a pose of the end-tool from a start pose to a goal pose to perform an assembly operation, to: determine the control law for controlling the plurality of motors to move the robotic arm according to the original trajectory; execute a self-exploration program that explores a space of the original trajectory by controlling the plurality of motors according to the control law while introducing different displacements from the original trajectory into a state of the robotic arm and registering, upon detecting the force experienced by the end-tool of the robotic arm, a pair of a measurement of a force sensor and a corresponding value of a displacement from the original trajectory to produce training data indicative of the space of the original trajectory; and learn, using the training data, a non-linear compliant control law including a non-linear mapping that maps the measurements of the force sensor to a direction of corrections to the original trajectory defining the control law. The instructions executed by the at least one processor, further cause the processor, upon receiving an end-pose modification of the original trajectory including at least one or combination of a new start pose of the end-tool of the robotic arm and a new goal pose of the end-tool measured with an accuracy less than an accuracy of the assembly operation, to: transform the original trajectory according to the end-pose modification to produce a transformed trajectory; update the control law according to the transformed trajectory to produce the updated control law, and command the plurality of motors to control the robotic arm according to the updated control law corrected with the compliance control law learned for the original trajectory.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1B shows an exemplary assembly operation, according to an embodiment.

FIG. 7B illustrates the displacements in an alignment condition in which an edge of the movable object touches a surface on a side of the immovable object, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
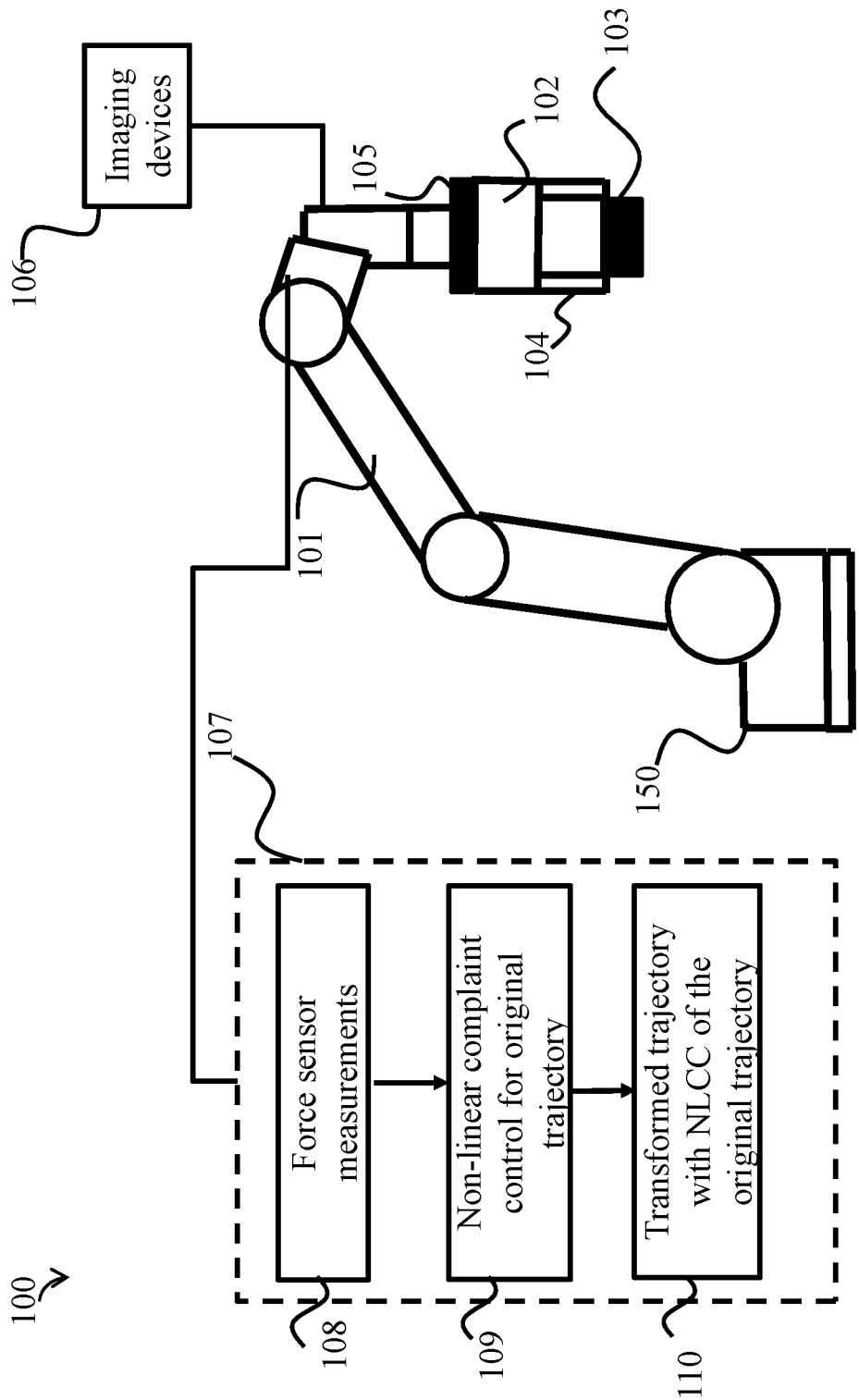
FIG. 1A shows configuration of a robot, according to some embodiments.

FIG. 1A shows a robotic configuration 100 of a robot 150, according to some embodiments. The robot 150 includes a robotic arm 101 for performing an assembly operation. The robotic arm 101 includes a wrist 102 for ensuring multiple degrees of freedom of moving an object. In some implementations, the wrist 102 is provided with an end-tool 104 for holding an object 103 and/or for performing any other robotic operation, such as an assembly operation. The end-tool 104, for example, may be a gripper. Hereinafter, the 'end-tool' and 'gripper' may be used interchangeably. According to an embodiment, an objective of the assembly operation is to place two parts together, typically in close contact. For example, insertion of an object, along a trajectory, into another object to assemble a product.

FIG. 1B shows exemplary assembly operation, according to an embodiment. FIG. 1B is explained in conjunction with the robot 150 as shown in FIG. 1A. The robot 150 is configured to perform the assembly operation, e.g., insert the object 103 into another object, along the trajectory. As used herein, the trajectory corresponds to a path defining a motion of the object 103 held by the gripper 104, for performing the assembly operation. In a simple scenario, the trajectory can dictate only a vertical motion of the wrist 102. However, as the wrist 102 includes multiple degrees of freedom, the trajectory may comprise a motion profile spanning in multi-dimensional space.

A pose of an object refers to a combination of a position and an orientation of the object. The gripper 104 is holding initially the object 103 (e.g., a peg) which is movable, in a start pose 111. A pose of the gripper 104 corresponding to the start pose 111 is referred to as a start pose of the gripper 104. According to an embodiment, aim of the insertion operation is to insert the movable object 103 into an immovable object 112 of pose 115, wherein the object 112 includes a hole to receive the object 103. The pose 115 of the object 112 may refer to a position and/or orientation of the object 112. The robot 150 is configured to move the gripper 104 along a trajectory 113 to insert and place the object 103 in a pose 114 in the hole of the object 112. The pose 114 of the object 103 in the hole of the object 112 is referred to as a goal pose. A pose of the gripper 104 corresponding to the goal pose is referred to as a goal pose of the gripper 104.

The goal pose of the gripper 104 is determined based on a position of the object 112. At the end of a successful execution of the insertion operation, the pose of the gripper 104 of the robot arm 101 is considered to have attained the goal pose of the gripper 104. Therefore, achieving the goal pose of the gripper 104 is equivalent to the successful execution of the insertion operation. According to an embodiment, the trajectory 113 is defined according to the start pose and goal pose of the gripper 104, and the pose 115 of the object 112. Further, such assembly operation may be executed repeatedly by the robot 150.

Some embodiments are based on a recognition that the pose of the object 103 and the pose of the object 112 involved in the assembly operation may vary between the repetitions of the assembly operation, due to which one or combination of the object 103 and the object 112 are located in a different pose. For example, in case the object 112 arrives on a moving conveyor belt, it may not be possible, each time, the object 112 arrives at the moving conveyor belt in a particular pose (e.g. pose 115). Consequently, the object 112 may end up in a different pose. To that end, a change in the pose (the orientation and the position) of the object 112 involved in the assembly operation leads to at least one or combination of a new start pose and a new goal pose, which is referred to as an end-pose modification. As the trajectory is defined according to the start pose and goal pose of the gripper 104 and the pose 115 of the object 112, the trajectory 113 cannot be utilized for different assembly operations involving poses other than the aforementioned poses. In such a case, various measurement devices are used to determine pose of the objects 103 and 112. According to some embodiments, the measurement devices determine the new start pose and the new goal pose of the gripper 104. The measurement devices include imaging devices 106, such as industrial vision cameras. In some implementations, a single imaging device may be used.

However, accuracy of the pose of the object 103 and the pose of the object 112 determined by such cameras is less than accuracy of the assembly operation. For example, errors in the pose determination by the industrial vision cameras are in the order of 1-2 mm, unless expensive imaging device is used. Such error is at least an order of magnitude larger than tolerances needed in precision insertion operations (which can be in the order of 0.1 mm) Therefore, due to the significant inaccuracy of the determined pose of the objects 103 and 112, the object (e.g. 103) to be inserted may collide with parts of another object (e.g. 112) involved in the assembly operation.

Figure 1C:
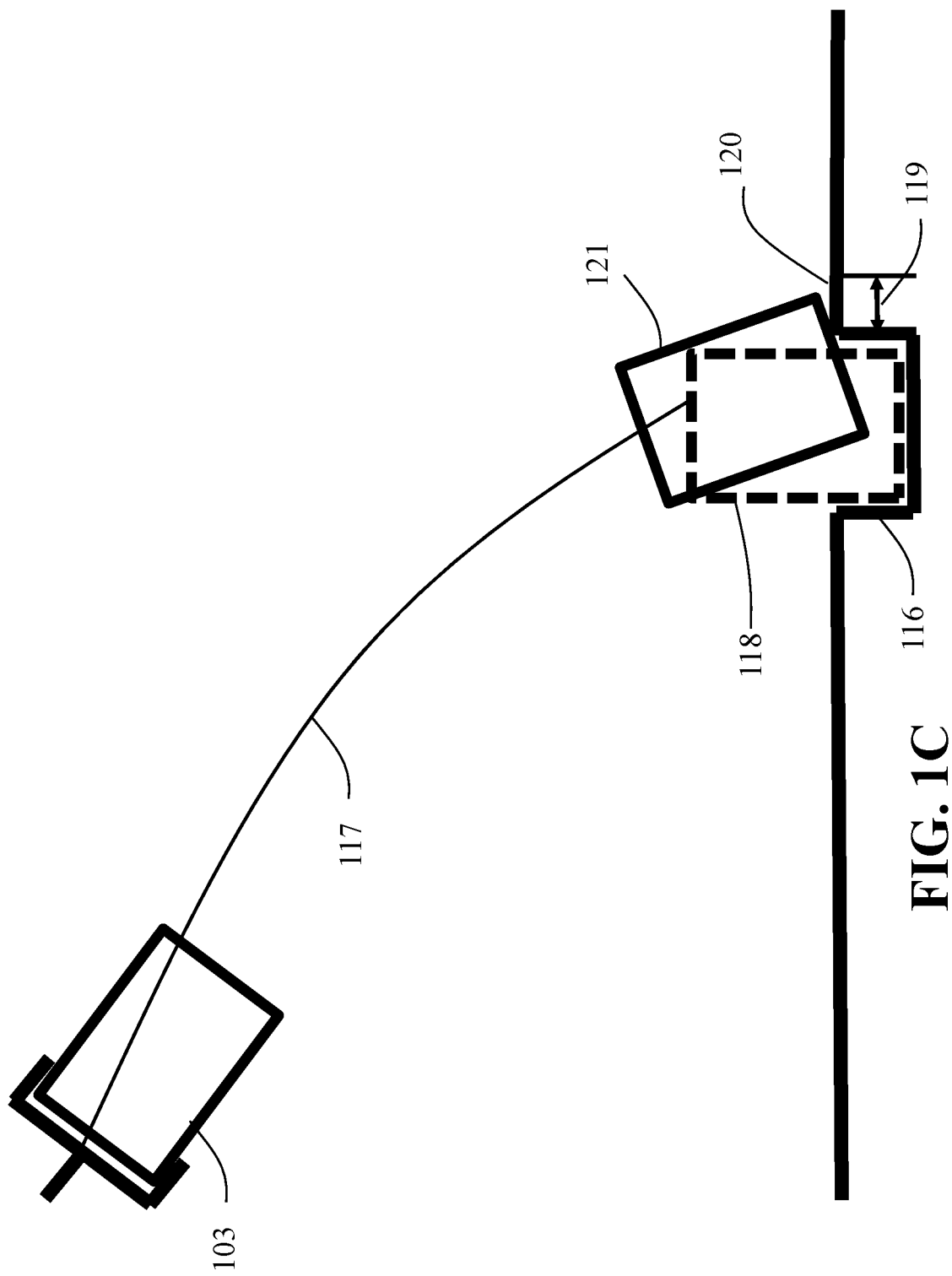
FIG. 1C shows a result of the assembly operation due to inaccurate determination of pose of an object by imaging devices, according to some embodiments.

FIG. 1C shows a result of the assembly operation due to inaccurate determination of pose of the object 103 by the imaging devices, according to some embodiments. FIG. 1C is explained in conjunction with the robot 150 shown in FIGS. 1A and 1B. For example, the pose 115 of the object 112 (shown in FIG. 1B) may change and the imaging devices 106 may determine that the pose 115 is changed to pose 116. In particular, the imaging devices 106 may determine that the object 112 is at position 116. As the position 115 of the object 112 is changed to the position 116, the goal pose 114 (shown in FIG. 1B) may change to a goal pose 118. The trajectory 113 is transformed into a trajectory 117 according to the pose 116 and the goal pose 118. However, if true position of the object 112 is determined inaccurately, and is away from the determined position 116 by a specific distance 119, the trajectory 117 trajectory does not result into a correct insertion and the collision may occur between the object 103 and the part of the object 112, for example, an edge 120. As a result, a displacement of the object 103 occurs and the object 103 may remain in incorrect pose 121. Further, due to such collision the gripper 104 of the robotic arm 101 may experience force specific to the pose 121.

To that end, some embodiments are based on the recognition that the poses determined by the imaging devices 106 alone are not sufficient to perform the assembly operation successfully. To overcome this limitation of the imaging devices 106, adaptive assembly strategy (AAS) 107 is used. The AAS 107 is based on the recognition that force experienced in the assembly operation can be used to correct the inaccuracy of the pose determination by the imaging devices 106. To that end, the robot 150 is equipped with a force sensor. For example, a force sensor 105 is operatively connected to the wrist 102 or the end-tool of the robotic arm 101. The force sensor 105 is configured to produce measurements force and/or torque experienced 108 (also referred as force sensor measurements 108) by the end-tool (the gripper 104) of the robot 150 during the assembly operation. In some implementations, the robot 150 is equipped with a torque sensor for measuring torque experienced by the end-tool 104. Some embodiments are based on recognition that the force sensor measurements 108 can be used to correct the trajectory 117 such that the goal pose 118 is achieved.

To that end, a non-linear mapping is determined 109 for the trajectory 113. The non-linear mapping maps the force sensor measurements 108 onto corrections to the trajectory 117 in a non-linear manner. In other words, the non-linear mapping provides corrections for the trajectory 117 of the robot 150 during the assembly operation along the trajectory 117. The corrections may include displacement to the object 103 that allows achieving the new goal pose. To that end, the non-linear mapping provides mapping between the forces and the displacements. In an alternate embodiment, the corrections may correspond to pose and/or velocity corrections. The trajectory 113 is referred to as an 'original trajectory'. As explained below, the original trajectory is the trajectory for which the non-linear mapping is determined.

Some embodiments are based on understanding that a non-linear mapping can be determined for a specific assembly operation along a specific trajectory (e.g. trajectory 113) and repeated any number of times for the same assembly operation by robots that are same as robot 150. However, when the start and/or the goal pose involved in the assembly operation change, the original trajectory 113 is transformed accordingly to produce a transformed trajectory. Subsequently, the non-linear mapping determined for the original trajectory 113 may need to be modified according to a transformed trajectory (e.g. trajectory 117).

However, some embodiments are based on realization that if the original trajectory 113 is transformed according to changes in the start and/or goal pose, the non-linear mapping determined for the original trajectory 113 is valid for the transformed trajectory without any additional adaptation 110. For example, such a realization is true because sign and magnitude of the forces depends entirely on a relative position of the two objects (e.g. the object 103 and the object 112), and not on their absolute position in space. Therefore, if one of the object 103 and the object 112 is moved to a different position and the other object approaches it along a similarly transformed trajectory, the same forces may arise.

Accordingly, such realization allows some embodiments to determine offline, i.e. in advance, an original trajectory (e.g. trajectory 113) and a non-linear mapping for the original trajectory, and transform online, i.e. during the assembly operation, the original trajectory to accommodate changes in the start and/or goal pose and to control the robot 150 according to the transformed trajectory and the non-linear mapping determined for the original trajectory. In such a manner, various embodiments can accommodate changes in the start and/or goal poses measured with the imaging devices 106, such as cameras, having precisions less than the precision of the assembly operation. As a result, it allows using economical cameras in the assembly operation. Further, it minimizes task-specific robot programming as the non-linear mapping determined for the original trajectory can be retained for the transformed trajectory.

The non-linear mapping can be determined via training. For example, a supervised machine learning algorithm can be used to learn the mapping between the forces and the displacements due to the forces. Such mapping is learned offline. The mapping from the displacements to the forces is typically many-to-one, i.e. multiple displacements may sometimes result in a same force. During online, i.e. in real-time assembly operation, an inverse mapping of such mapping can be used for the correction in the assembly operation. However, the inverse mapping may be one-to-many, i.e. a force measured may be mapped to multiple displacements, which is not a function that can be learned by means of machine learning. Such an ambiguity of the mapping challenges a possibility of learning the non-linear mapping. Some embodiments are based on a realization that adaptive complaint control learning can be used in the AAS to eliminate the ambiguity in the mapping of the non-linear complaint controller.

Figure 2:
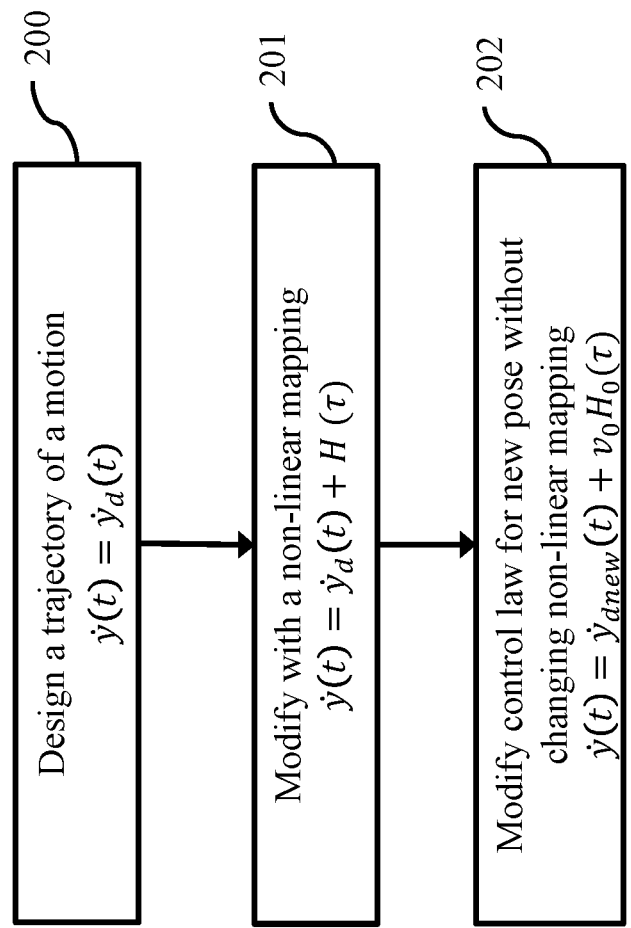
FIG. 2 shows a schematic for determining a control law based on adaptive complaint control learning to eliminate an ambiguity in a non-linear mapping, according to some embodiments.

FIG. 2 shows a schematic for determining a control law based on the adaptive compliant control learning to eliminate the ambiguity in the non-linear mapping, according to some embodiments. Some embodiments are based on the understanding that a trajectory (for example, the trajectory 113) can be designed 200 for a motion of the gripper 104 that performs the assembly operation. The trajectory 113 include one or combination of a pose of the gripper 104 as a function of time and velocity of the gripper 104 as a function of time. A control law is determined to track the trajectory 113. Example of such a control law is:

$$\dot{y}(t) = \dot{y}_d(t), \quad (1)$$

where $\dot{y}_d(t)$ is a velocity (relative change in position per time step) that is needed to achieve a desired trajectory $y_d(t)$, and $\dot{y}(t)$ is actual velocity realized by a low-level robot controller.

However, due to errors of control devices (such as actuators) of the robot 150 and the measurement devices of the robot 150, it is difficult to control the gripper 104 along the trajectory 113 precisely. For example, in practice, industrial robot controllers result at least small errors while following the desired trajectory. To that end, some embodiments are based on recognition that the control law can be combined with a compliant control to adjust the errors of the control devices of the robot 150 and the measurement devices of the robot 150. In such cases, the measurements of the force by the force sensor 105 can be used by a stiff actuator to move the gripper 104 linearly in a direction opposite to the direction of the force. To that end, the control law, for example, can be given by $$\dot{y}(t) = \dot{y}_d(t) + K\tau,$$

where $\tau$ are the forces and/or torque measured the force sensor 105, and K is a linear diagonal matrix with predetermined values that depend on how compliant the gripper 104 needs to be with respect to encountered obstacles.

However, such a compliant control law is insufficient in situations when inaccuracy of the measurements devices is greater than the accuracy of the assembly operation. For example, in the insertion operation inserting the object 103 into the hole of the object 112, if the object 103 experiences a vertical force due to colliding with an edge of the hole of the object 112, the stiffness control law with a diagonal matrix K cannot generate a horizontal motion towards a center of the object 112. For such cases, an active interpretation of the forces measured and generation of corrective motions based on the forces measured is needed.

To that end, some embodiments modify the control law (1) to a non-linear compliant control law 201. The non-linear compliant control law is obtained by using the non-linear mapping with the control law (1) Accordingly, the non-linear compliant control law can be given by $$\dot{y}(t) = \dot{y}_d(t) + H(\tau), \quad (2)$$

where H is the non-linear mapping (function) that produces corrections to the velocity of the robot 150.

The control law (2) combining the trajectory with the non-linear compliant control law can be determined for a specific assembly operation along a specific trajectory. Therefore, in a case the start and/or the goal pose of the assembly operation changes, the original trajectory 113 is transformed according to the changes in the start and/or the goal pose to produce the transformed trajectory. Further, the control law $\dot{y}(t) = \dot{y}_d(t) + H(\tau)$ according to the original trajectory 113 is transformed into $$\dot{y}(t) = \dot{y}_{d\,new}(t) + H_{new}(\tau), \quad (3)$$

for controlling according to the transformed trajectory.

As described in description of FIGS. 1A to 1B that if the original trajectory 113 is transformed according to changes in the start and/or goal pose, the non-linear mapping learned for the original trajectory 113 holds true for the transformed trajectory without any additional adaptation. Therefore, the control law (3) is modified 202 according to the transformed trajectory and the non-linear mapping learned for the original trajectory 113. In other words, the control law (3) is modified 202 for new pose (changed start and/or goal pose) without changing the non-linear mapping learned for the original trajectory 113. To that end, the control law is updated, for example, as $$\dot{y}(t) = \dot{y}_{dnew}(t) + H(\tau), \tag{4}$$

According to some embodiments, the original trajectory 113 can be transformed into the transformed trajectory using an affine mapping of the original trajectory 113. In other embodiments, the original trajectory 113 can be represented by Dynamic Movement Primitives (DMP). DMPs are sets of parametrized ordinary differential equations (ODE) that can generate a trajectory (e.g., the trajectory 113) for achieving the assembly operation. The DMPs can easily adapt the original trajectory according to the new start and goal pose, thus constituting a closed-loop controller. In other words, the DMP of the original trajectory can accept the new start pose and the new goal pose to produce the transformed trajectory. Also, the DMPs can be learned from few training examples, including even a single one. Thus, the control law (3) can be written as $$\dot{y}(t) = DMP_{new}(t) + H(\tau), \tag{5}$$

However, as described in description of FIGS. 1A to 1B, the ambiguity existing in the non-linear mapping challenges the learning of the non-linear compliant control law.

According to some embodiments, the adaptive compliant control learning is used to overcome the ambiguity. The adaptive compliant control learning is based on a realization that the exact magnitude of the displacement does not need to be recovered for successful corrective action, and furthermore, multiple displacements can generate the same forces only if the sign of the multiple displacements is same, as long as the magnitude of the displacement does not exceed a radius R of the object being inserted i.e. object 103. Based on this realization, in the adaptive compliant control learning, a supervised machine learning algorithm is used to learn the mapping $sign(d_i) = H_0(\tau_i)$, for all examples i=1, N such that $\|d_i\| \leq R$. If the radius of the object 103 is known, it can be provided to the supervised machine learning algorithm. If not, then the radius of the object 103 can be found by searching for a largest value of R that results in a good fit on the training examples with limitation $\|d_i\| \leq R$. Therefore, the non-linear mapping that maps the measurements of the force sensor to a direction of corrections to the original trajectory is learned. After a mapping $H_0(\tau)$ is learned, according to an embodiment, the mapping $H\tau$ can be obtained by scaling it by a suitable magnitude of correction in terms of velocity constant $v_0$. To that end, $$H(\tau) = v_0 H_0(\tau),$$

wherein a value of $v_0$ is a predetermined value. In some implementations, the value of $v_0$ does not exceed the radius R of the object being inserted. Thus, the non-linear compliant control law, for mapping the measurements of the force sensor 105 to the correction of the original trajectory 113, is configured to use the predetermined magnitude of the correction ($v_0$) and determine a direction of the correction by a non-linear function of the force measurements trained with respect to the original trajectory 113. Therefore, such realization of learning and modification of the mapping eliminates the ambiguity existed. Accordingly, the control law (5) is updated as $$\dot{y}(t) = DMP_{new}(t) + v_0 H_0 \tau. \tag{6}$$

The control law (6) may also be written as $$\dot{y}(t) = \dot{y}_{dnew}(t) + v_0 H_0(\tau) \tag{7}$$

To that end, the AAS including the adaptive complaint control learning eliminates the ambiguity or problem in learning the non-linear mapping. Further, such AAS may be applied for performing contact-rich assembly operations having variable start and goal pose, under the condition of the accuracy of the determined position of objects being assembled is less than accuracy of the assembly operation. The robot 150 controls one or more of the robotic arm 101, the wrist 102 or the gripper 104, according to the updated control law i.e. the control law (5), for performing the assembly operation.

Figure 3:
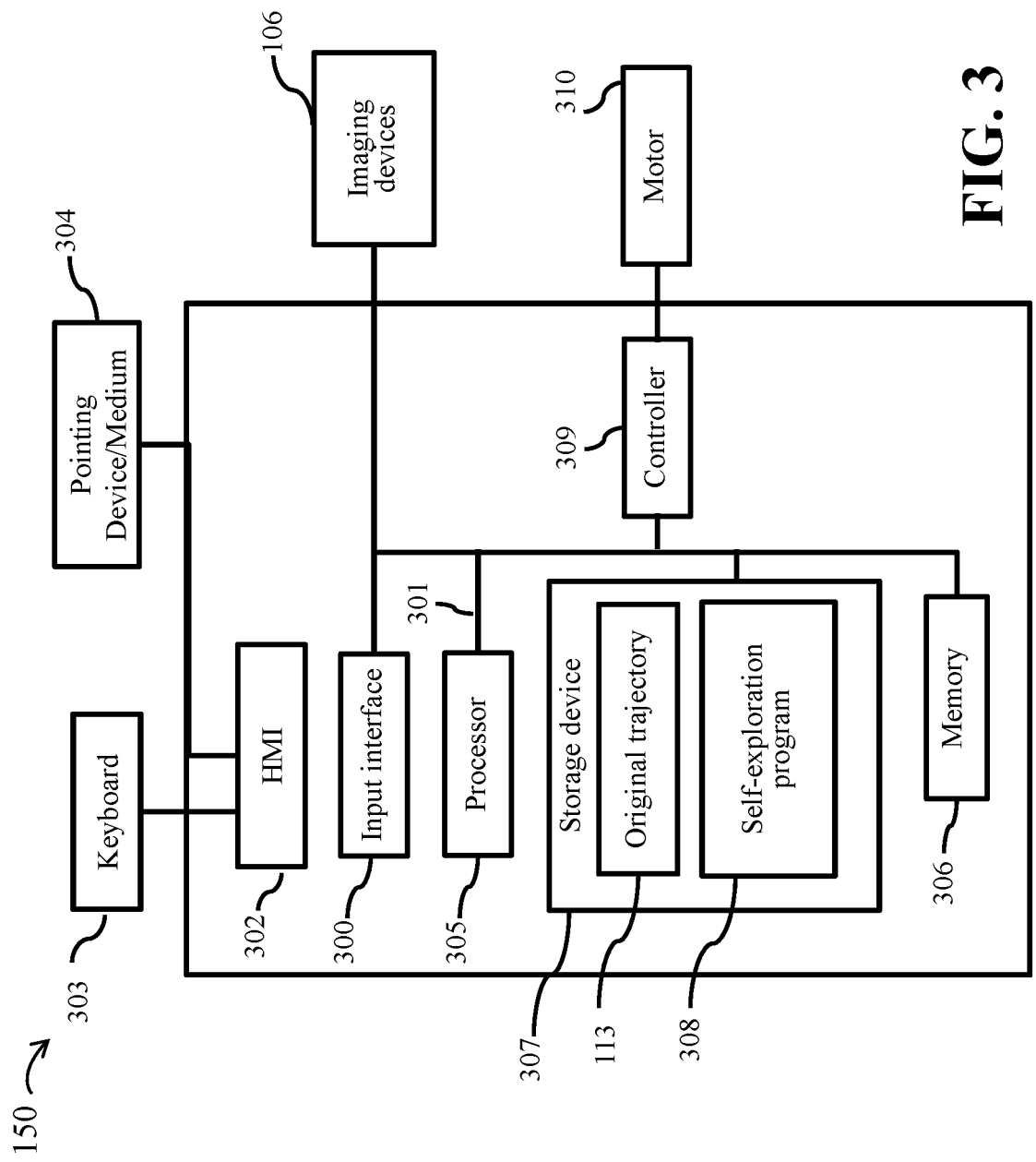
FIG. 3 shows a block diagram of the robot for performing the assembly operation, according to some embodiments.

FIG. 3 shows a block diagram of the robot 150 for performing the assembly operation, according to some embodiments. The robot 150 includes an input interface 300 configured to receive data indicative of an original trajectory (e.g., trajectory 113) for the motion of the robotic arm transitioning a pose of the end-tool 104 from a start pose to a goal pose to perform an assembly operation. The input interface 300 may be further configured to accept an end-pose modification. The end-pose modification includes at least one or combination of the new start pose of the end-tool 104 and the new goal pose of the end-tool 104 measured with accuracy less than the accuracy of the assembly operation. In some embodiments, the input interface 300 is configured to receive measurements indicative of force experienced by the end-tool 104 during the assembly operation. Such measurements are produced by the force sensor 105. The measurements may be raw measurements received from the force sensor or any derivative of the measurements, representing the force experienced.

The robot 150 may have a number of interfaces connecting the robot 150 with other systems and devices. For example, the robot 150 is connected, through a bus 301, to the imaging devices 106 to receive the new start pose and the goal pose via the input interface 300. Additionally or alternatively, in some implementations, the robot 150 includes a human machine interface 302 that connects a processor 305 to a keyboard 304 and pointing device 304, wherein the pointing device 304 can include a mouse, trackball, touchpad, joy stick, pointing stick, stylus, or touchscreen, among others. In some embodiments, the robot 150 may include a motor 310 or a plurality of motors configured to change a motion of the robotic arm according to a command produced according to a control law. Additionally, the robot 150 includes a controller 309. The controller 309 is configured to operate the motor 310 to change the robotic arm 101 according to the control law.

The robot 150 includes the processor 305 configured to execute stored instructions, as well as a memory 306 that stores instructions that are executable by the processor 305. The processor 305 can be a single core processor, a multi-core processor, a computing cluster, or any number of other configurations. The memory 306 can include random access memory (RAM), read only memory (ROM), flash memory, or any other suitable memory systems. The processor 305 is connected through the bus 301 to one or more input interfaces and the other devices.

The robot 150 may also include a storage device 307 adapted to store different modules storing executable instructions for the processor 305. The storage device 307 stores the original trajectory 113 for the motion of the robotic arm 101 transitioning a pose of end-tool 104 from the start pose to the goal pose to perform the assembly operation. The original trajectory 113 is stored in 307 in the form of the dynamic movement primitives (DMP) including the ordinary differential equations (ODE).

The storage device 307 also stores self-exploration program 308 for producing training data indicative of a space of the original trajectory 113. The storage device 307 can be implemented using a hard drive, an optical drive, a thumb drive, an array of drives, or any combinations thereof. The processor 305 is configured to determine the control law for controlling the plurality of motors to move the robotic arm according to the original trajectory, and execute the self-exploration program 308 that explores a space of the original trajectory by controlling the plurality of motors according to the control law while introducing different displacements from the original trajectory into a state of the robotic arm and registering, upon detecting the force experienced by the end-tool of the robotic arm, a pair of a measurement of a force sensor and a corresponding value of a displacement from the original trajectory to produce training data indicative of the space of the original trajectory. The processor 305 is further configured to learn, using the training data, a non-linear compliant control law including a non-linear mapping that maps the measurements of the force sensor to a direction of corrections to the original trajectory defining the control law.

Figure 4:
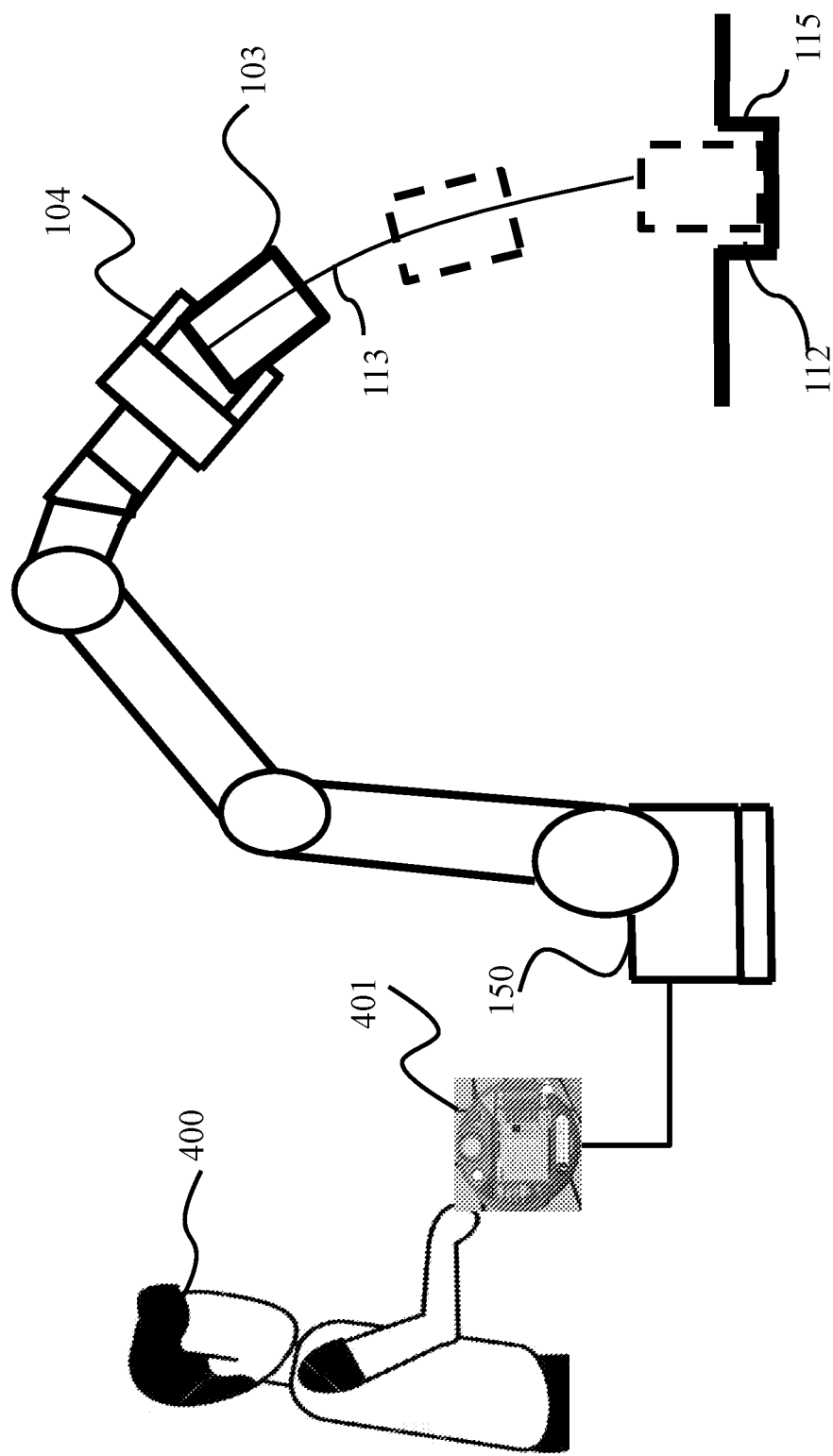
FIG. 4 illustrates a schematic for learning of dynamic movement primitives (DMP) of an original trajectory through demonstrations, according to some embodiments.

Further in some embodiments, the processor 305 is further configured to transform the original trajectory according to the end-pose modification to produce a transformed trajectory, and update the control law according to the transformed trajectory to produce the updated control law. The processor 305 is further configured to command the plurality of motors to control the robotic arm according to the updated control law corrected with the compliance control law learned for the original trajectory FIG. 4 illustrates a schematic for learning of the DMP of the original trajectory 113 through demonstrations, according to some embodiments. Some embodiments are based on understanding that the DMP of the original trajectory 113 can be learned through the demonstrations. In the demonstrations, the immovable object (i.e. the object 112) is fixed in the pose 115. Further, the demonstrations are performed by a human operator 400 by directing the robot 150 holding the object 103 in its gripper 104, along the original trajectory 113 that successfully completes the assembly operation. According to an embodiment, the human demonstrator can direct the robot 150 to track the original trajectory by means of a teaching pendant 401 that stores coordinates of via points corresponding to the trajectory original 113 in the memory 306 of the robot 150. The teaching pendant 401 may be a remote control device. The remote control device may be configured to transmit robot configurations settings (i.e. the settings of the robot) to the robot 150 for demonstrating the original trajectory 113. For instance, the remote control device sends control commands such as move to XYZ direction, velocity control commands, joint position commands, and the like, for demonstrating the original trajectory 113. In an alternate embodiment, the human operator 400 can direct the robot 150 by means of the joystick, through kinesthetic feedback, and the like. The human operator 400 may direct the robot 150 to track the original trajectory 113 multiple times for the same fixed pose 115 of the immovable object 112.

The trajectory 113 may be represented as $y_d(t)$, t in [0,T] is that of the via points of the end-tool of the robot 150 in Cartesian space (pose and attitude).

After one or more trajectories y(t) are recorded for the same fixed pose 115, the processor 305 is configured to apply a DMP learning algorithm to learn a separate DMP for each of components of y(t). Such DMP is of a form of two coupled ODEs, for example, $\dot{x} = -\gamma x$ and $\ddot{y} = \alpha[\beta(g-y)-\dot{y}]+f(x,g)$, where f(x, g) is forcing function and can be given by $$f(x, g) = \frac{\sum_{i=1}^{N} \psi_i w_i}{\sum_{i=1}^{N} \psi_i} x(g - y_0)$$

The forcing function is parameterized by means of parameters $w_i$. According to some embodiments, the parameters $w_i$ are obtained through least-squares regression from the trajectory y(t). In such a manner, by applying the DMP learning algorithm, a set of DMPs are determined. The set of DMPs can generate a new desired trajectory $y_{new}(t)$, given a new goal pose $g_d$, by integrating the DMP's ODEs forward in time from the starting position and without any additional demonstrations or programming.

It is an objective of some embodiments to determine the non-linear mapping with minimal human involvement. To that end, it is an objective of some embodiments to learn the non-linear mapping of the controller via training, e.g., a deep learning. In such a manner, where there is a need to deploy new insertion assembly adaptable to new end poses measured with insufficient accuracy, the trajectory can be determined via human demonstration, while the non-linear mapping can be learned through training implemented by means of a self-exploration program, thereby minimizing human involvement. In particular, the robot 150 receives the original trajectory 113 as input. In response to receiving the original trajectory 113, the robot 150 executes the self-exploration program.

Figure 5A:
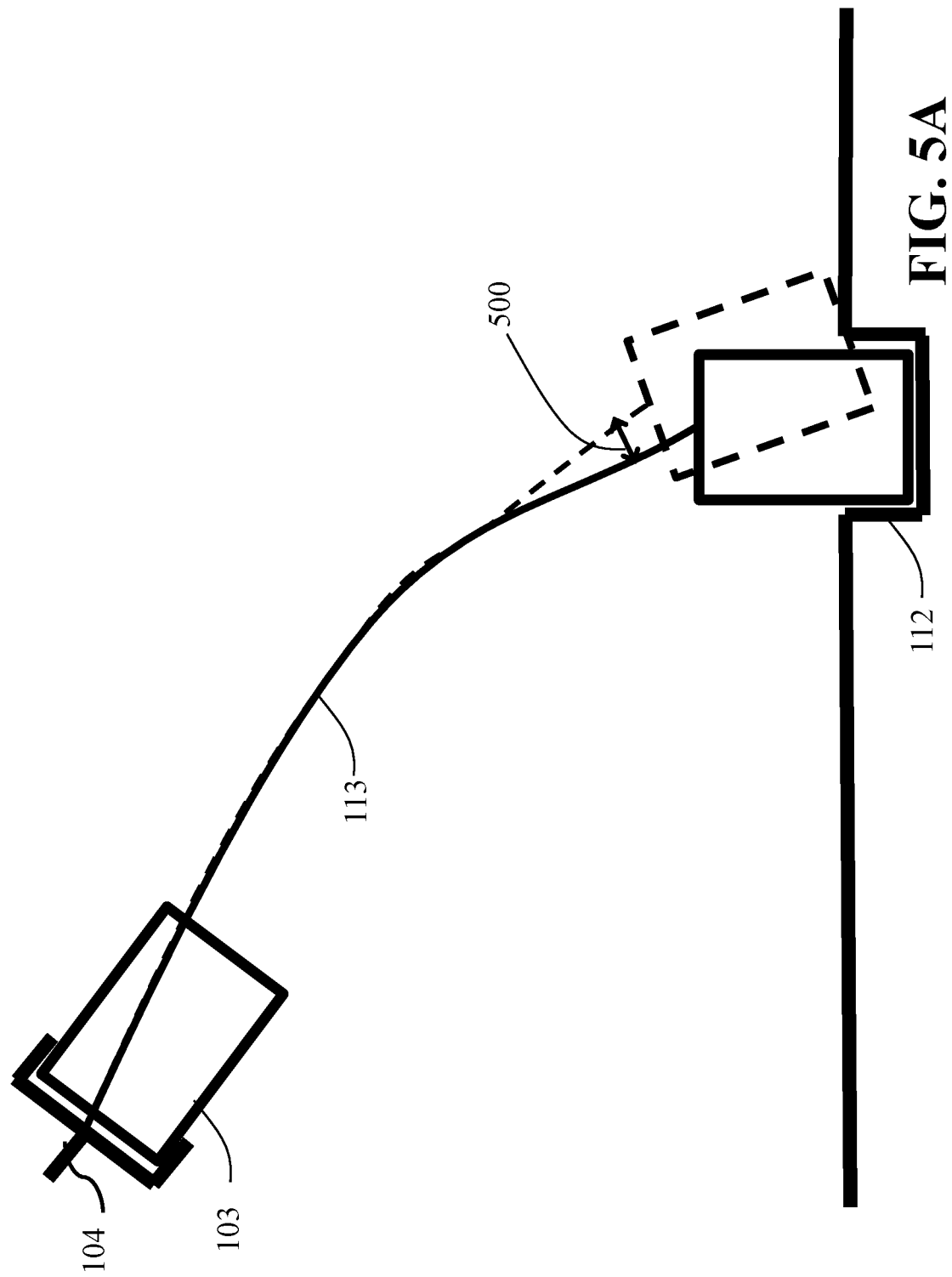
FIG. 5A illustrates execution of self-exploration program by the robot, according to some embodiments.

FIG. 5A illustrates execution of the self-exploration program by the robot 150, according to some embodiments. The end-tool 104 of the robotic arm 101 is configured to track the original trajectory $y_d(t)$ 113 by controlling the plurality of motors according to the control law, to insert the object 103 into the immovable object 112. The execution of the self-exploration program includes exploring a space of the original trajectory $y_d(t)$ 113 while introducing a displacement from the original trajectory $y_d(t)$ 113 into a state of the robotic arm. For example, a displacement d(t) 500 from the original trajectory 113 is introduced at the end-tool 104 of the robotic arm 101. Consequently, the end-tool 104 may experience a force τ. The force experienced by the end-tool 104 is measured by a force sensor arranged at the end-tool 104 (e.g., the force sensor 105). Further, a pair of the measurement of the force sensor and the corresponding value of the displacement from the original trajectory $y_d(t)$ 113 is registered by the robot 150.

Some embodiments are based on recognition that the original trajectory $y_d(t)$ 113 demonstrated by the human demonstrator can be assumed to be safe and collision-free, relying on ability of the demonstrator to ensure safety while guiding the robot 150 during the demonstration, the same is not true for modified trajectory $y_d(t)+d(t)$ that is deliberately perturbed from the original safe trajectory $y_d(t)$ 113. Some embodiments are based on further recognition that the objects to be assembled (e.g., the objects 103 and 112) may collide or jam when the modified trajectory $y_d(t)+d(t)$ is followed instead of the original trajectory $y_d(t)$. Thus, some embodiments are based on objective of traversing the modified trajectory $y_d(t)+d(t)$ in a safe manner that does not damage the robot 150 or the objects being assembled.

In some embodiments, the robot 150 equipped with the force sensor 105 includes safeguards that turns off the robot 150 when the sensed forces exceed a threshold, so that the robot 150 is protected from damage due to the collision. However, when the objects being assembled are delicate parts (e.g., electronic parts), the threshold may be high to protect the objects being assembled. Some embodiments are based on realization that the modified trajectory can be safely executed by using a compliant controller that reacts to the experienced forces and acts to minimize the experienced forces. For example, a linear compliant law $\dot{y}(t)=\dot{y}_d(t)+K\tau$ with a diagonal matrix K (also referred as stiffness matrix) can be used.

In an embodiment, entries of the diagonal matrix can be determined based on the maximum force that is safe to apply in a particular direction. For example, if the maximum force is $f_{zmax}$ along z direction/axis, and the maximum velocity along z direction is $$\dot{y}_{dzmax} = \max_t |\dot{y}_{dz}(t)|,$$

where a desired velocity along z direction is $\dot{y}_{dz}(t)$, then a value for an element $k_z$ of the diagonal matrix K can be $k_z=\dot{y}_{dzmax}/f_{zmax}$. Such element of the diagonal matrix K ensures that in case of obstruction along the z direction, when magnitude of the desired velocity $\dot{y}_{dz}(t)$ along the z direction always obeys $|\dot{y}_{dz}(t)|\leq \dot{y}_{dzmax}$, a correction $k_z f_z(t)$ due to the force $f_z(t)$ experienced along z direction (normally negative, if the desired velocity $\dot{y}_{dz}(t)$ is positive, and vice versa) may stop the robot 150, that is, $0=\dot{y}_z(t)=\dot{y}_{dz}(t)+k_z f_z(t)$, with $|f_z(t)|\leq f_{zmax}$, as desired. Here, $f_z$ is a component of vector $\tau(t)$ corresponding to the force sensed along the z direction, and remaining entries of the diagonal matrix K corresponding to other two linear contact forces (along x and y), as well as three moments around the axes, can be determined similarly.

According to an embodiment, execution of the linear compliant law $\dot{y}(t)=\dot{y}_d(t)+K\tau$ on the robotic arm 101 can be implemented by providing a series of commanded target positions $y_{c,k} \stackrel{\text{def}}{=} y_c(t_k)$ at discrete moments in time $t_k=k\Delta t$, where $\Delta t$ is a control step, to a compliant (impedance or admittance) controller with stiffness matrix K.

Figure 5B:
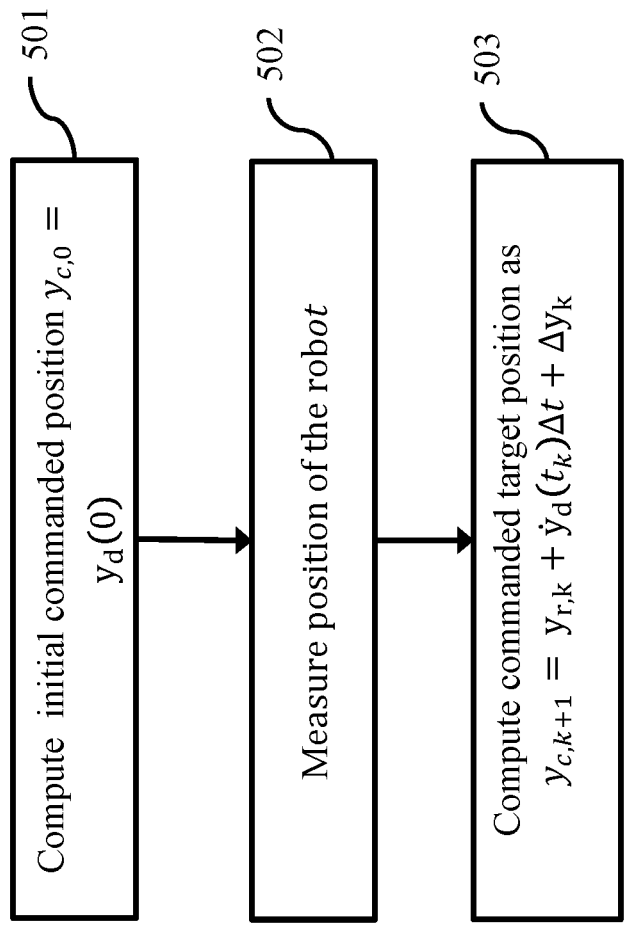
FIG. 5B shows a schematic for computing commanded target positions, according to some embodiments.

FIG. 5B shows a schematic for computing the commanded target positions $y_{c,k}$, according to some embodiments. At block 501, an initial commanded position is computed. The initial commanded position is given as $y_{c,0}=y_d(0)$, that is, it coincides with an initial position from the original trajectory $y_d(t)$. At block 502, at each subsequent control step k, an actual realized position of the robot (or the end-tool 104) $y_{r,k}=y(t_k)$ is measured. Further at block 503, the commanded target position $y_{c,k+1}$ for a next control step is computed, by the processor 305, as $y_{c,k+1}=y_{r,k}+\dot{y}_d(t_k)\Delta t+\Delta y_k$. Here, $\Delta y_k$ is the variation/displacement introduced to the original trajectory $y_d(t)$ at time step k. By using $y_{r,k}$ instead of $y_{c,k}$ in the computation of $y_{c,k+1}$, the robot 150 follows the velocity profile $\dot{y}_d(t_k)$, instead of an implied position profile (trajectory) $y_d(t_k)$. This ensures that when motion of the robot 150 is stopped due to a collision, an error between a real and the commanded target position does not accumulate with advance of time. Instead, if $y_{r,k}$ remains constant due to obstruction, collision, or jamming, each new commanded position $y_{c,k+1}$ is only a small relative displacement $\dot{y}_d(t_k)\Delta t$ from $y_{r,k}$, and not achieving the displacement $\dot{y}_d(t_k)\Delta t$ can be tolerated by the compliant controller without reaching excessive contact forces, according to the diagonal matrix K that specifies a degree of motion compliance.

During the execution of the linear compliant law $\dot{y}(t)=\dot{y}_d(t)+K\tau$, a time series of the measured position $y_{r,k}$ indicates where the robot 150 actually was at each control step. By comparing the measured position $y_{r,k}$ with where the robot (or the end-tool 104) was supposed to be according to the original trajectory $y_d(t)$, the processor 304 may compute the displacement at each control step as $d_k=d(t_k)=y(t_k)-y_d(t_k)=y_{r,k}-y_d(t_k)$.

The procedure described above with respect to FIGS. 5A and 5B can be followed multiple times, each time starting from the same initial position as in the original trajectory $y_d(t)$, and applying different displacements at various points in time. The displacements can be systematic, for example, introducing only one displacement at a single moment in time when the robot 150 is still in free space, before contact between the objects has occurred, and in a plane perpendicular to the motion of the robot 150 at that moment. Such displacements result in a modified trajectory at a constant offset from the original trajectory $y_d(t)$. In some embodiments, the displacements can also be random, that is, implemented by adding a small random variation at each moment, sampled from a probability distribution, for example Gaussian distribution.

As a result of multiple traversals of the original trajectory $y_d(t)$ with different displacements, data that relates direction and magnitude of the displacements with the forces experienced as a result is collected. When the robot 150 is moving in free space, without contact, the displacement with respect to the original trajectory $y_d(t)$ 113 cannot be inferred from contact forces, as the force experienced is zero. Therefore, the moments in time at which $\tau_k=0$ are discarded. For each remaining case, that is, when $\tau_k\neq 0$, a training example in a form of a pair $(\tau_i, d_i)$ is added to a database of training examples, with $\tau_i=\tau_k$ and $d_i=d_k$, where i is an index of the pair in the database.

To that end, a number of pairs of the measurements of the force sensor and the corresponding values of the displacements from the original trajectory $y_d(t)$ 113 are registered by the robot 150. The registered pairs form training data indicative of the space of the original trajectory $y_d(t)$ 113. The training data can be used to learn the non-linear mapping that maps the measurements of the force sensor to a direction of corrections to the original trajectory 113.

Figure 5C:
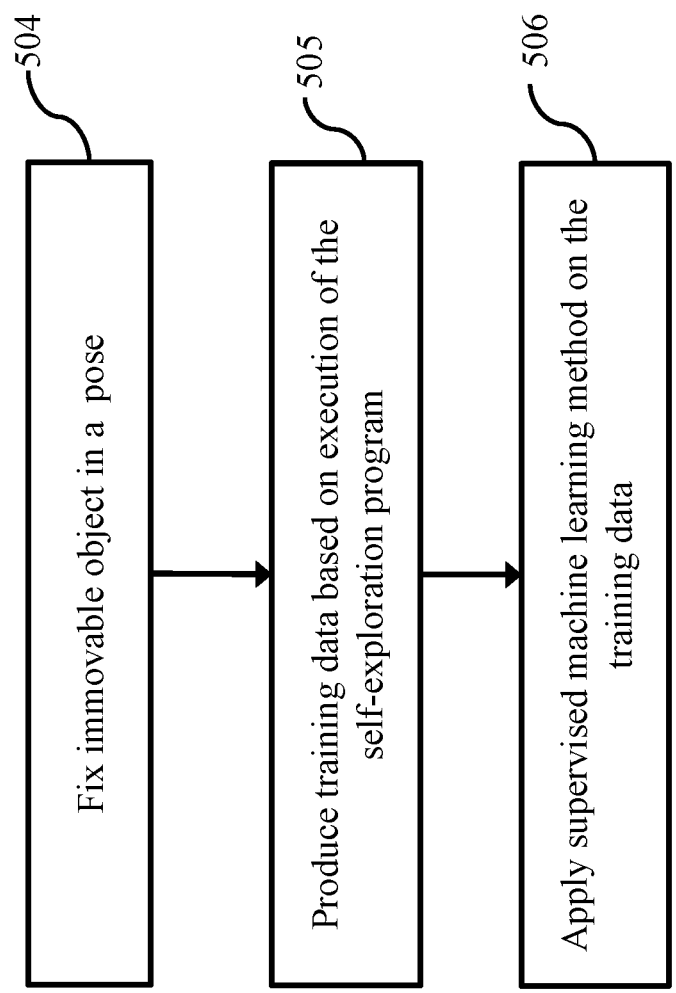
FIG. 5C shows a schematic of an overview of learning of a non-linear compliant control law, according to some embodiments.

FIG. 5C shows a schematic of an overview of learning of the non-linear compliant control law including the non-linear mapping, based on the training data, according to some embodiments. At step 504, the immovable object (i.e. the object 112) is fixed to its original pose i.e. pose 115.

At step 505, the processor 305 is configured to produce the training data based on execution of the self-exploration program (as described in detail above with reference to FIGS. 5A and 5B). The training data includes a number of pairs of the measurements of the force sensor and the corresponding values of the displacements from the original trajectory 113.

At step 506, the processor configured to apply a supervised machine learning method on the training data to learn the non-linear compliant control law that includes the non-linear mapping that maps the measurements of the force sensor to a direction of corrections to the original trajectory 113. According to an embodiment, the supervised machine learning method may include, for example, Gaussian Process Regression (GPR) or a Deep Neural Network (DNN). Further, the non-linear compliant control law can be used to correct a trajectory to complete the assembly operation.

Figure 6:
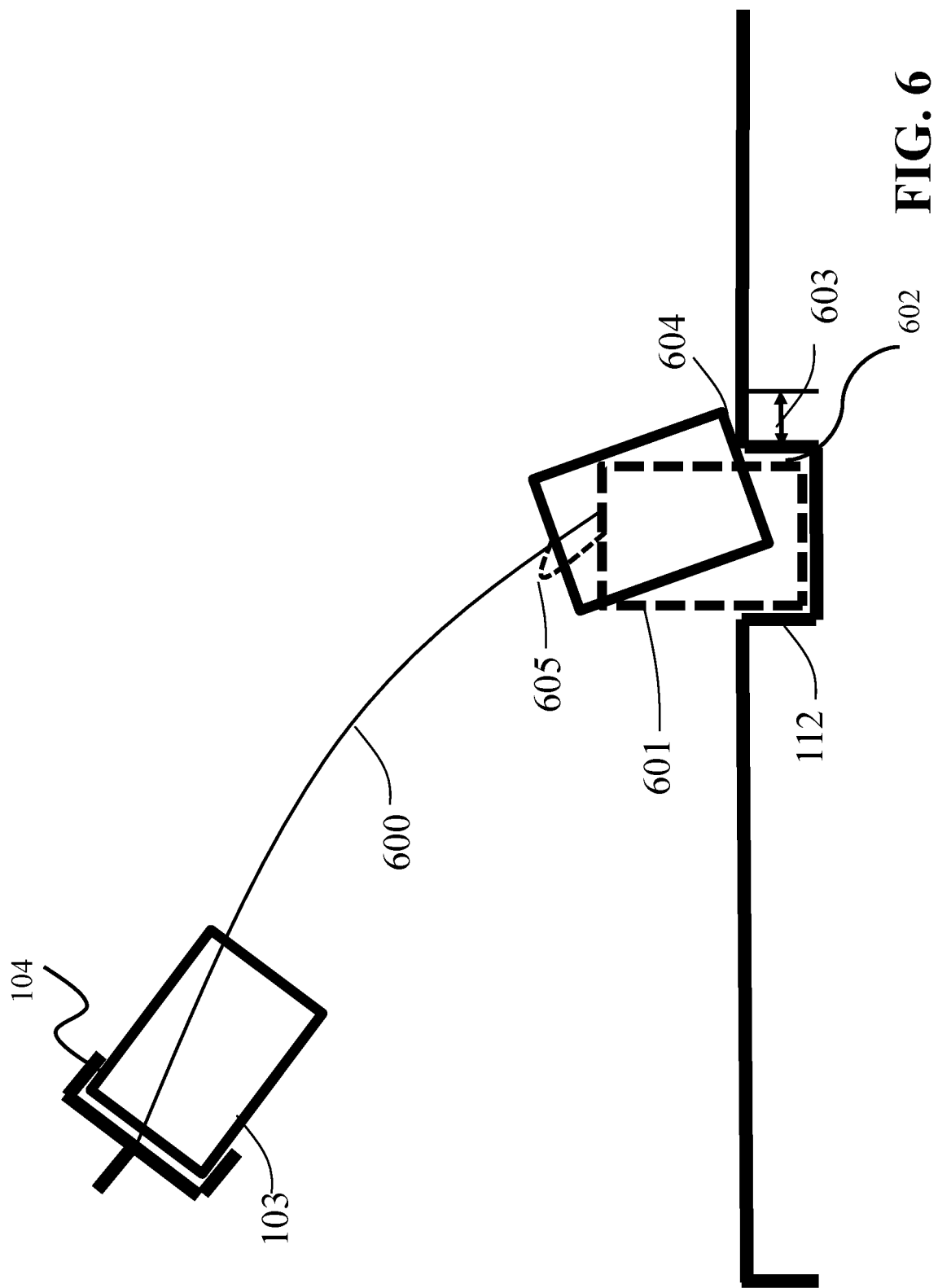
FIG. 6 shows a schematic of correcting a transformed trajectory using the non-linear compliant control law, according to some embodiments.

FIG. 6 shows a schematic of correcting a transformed trajectory 600 using the non-linear compliant control law, according to some embodiments. When a position of the immovable object 112 changes, the start pose and/or the goal pose of the end-tool 104 of the robot 150 change. For example, for a new position 602 of the immovable object 112, there exists a new goal pose of the end-tool 104 of the robot 150, such that the object 103 with a pose 601 can be inserted in the immovable object 112. The change in the position of the immovable object 112 is determined by the imaging device 106. For example, the imaging device 106 may determine the position 602 of the immovable object 112, The new goal pose of the end-tool 104 and/or a new start pose of the end-tool 104 are referred to as the end-pose modification. The end-pose modification may be received by the robot 150. Upon receiving the end-pose modification, the processor 305 is configured to transform the original trajectory 113 according to the end-pose modification, using the DMP, to produce a transformed trajectory 600. Further, the processor 305 is configured to update the control law (e.g., equation (1)) according to the transformed trajectory 600 to produce an updated control law.

Some embodiments are based on recognition that the position 602 of the immovable object 112 determined by the imaging device 106 may be inaccurate. For example, the imaging device 106 may determine the position 602 of the immovable object 112, however, true position of the immovable object 112 may be at a distance 603 away from the determined position 602. Due to such inaccuracy, execution of the transformed trajectory 600 may result a collision between the object 103 and an edge 604 of the immovable object 112. Consequently, the end-tool of the robot 150 experiences force. In response to the force experienced, the processor 305 provides corrections to the transformed trajectory 600 using the non-linear compliant control law learned for the original trajectory 113. For instance, the processor 305 is configured to add displacements to the transformed trajectory 600 based on the non-linear compliant control law. As a result, a new modified trajectory 605 is produced. The new modified trajectory 605 is not generated at the moment of the collision, instead the displacements with respect to the transformed trajectory 600 are gradually computed and added to the transformed trajectory 600. To that end, the updated control law is corrected with the the non-linear compliant control law. Further, the processor 305 is configured to command the plurality of motors of the robot 150 to control the robotic arm 101 according to the updated control law corrected with the non-linear compliant control law to complete the assembly operation.

Figure 7A:
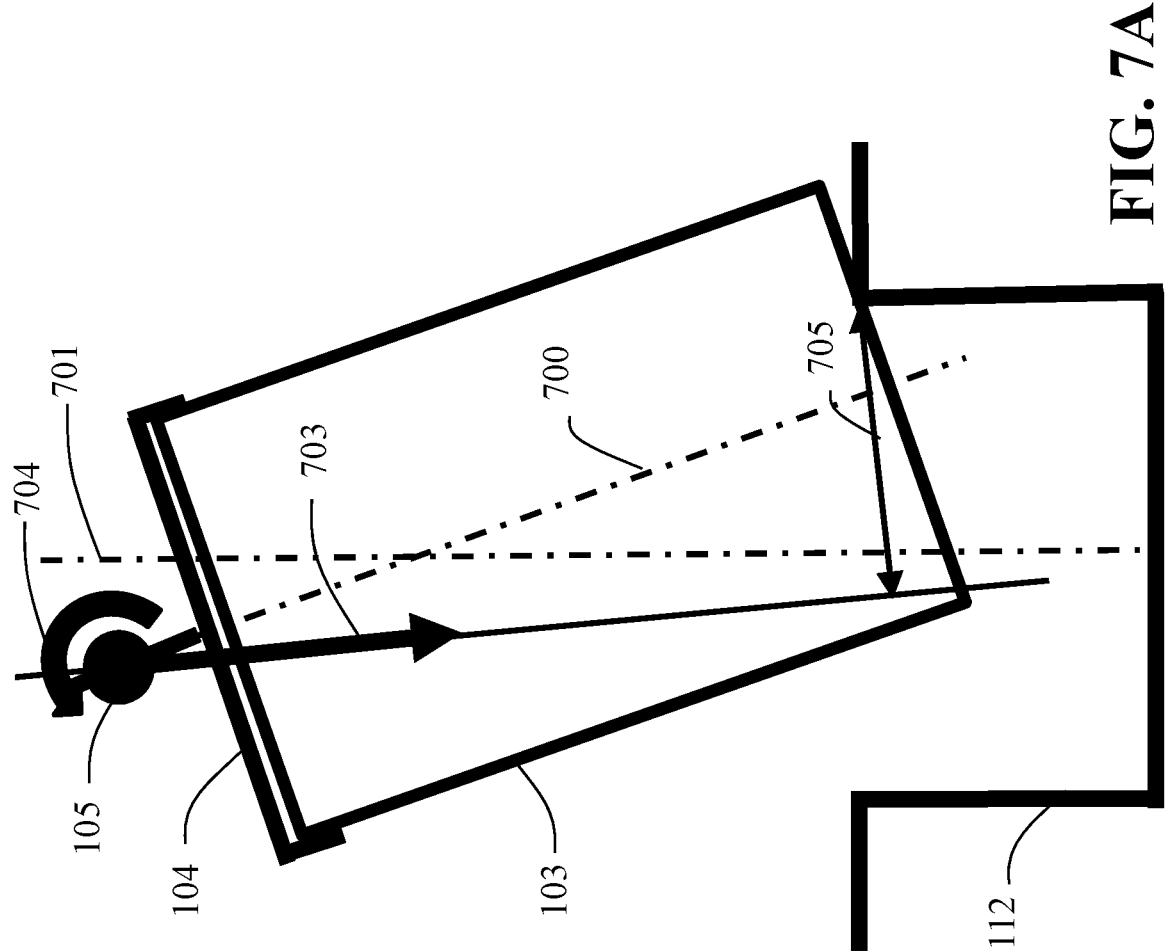
FIG. 7A illustrates computation of displacements in an alignment condition in which a bottom of a movable object touches an edge of an immovable object, according to some embodiments.

FIG. 7A illustrates computation of the displacements in an alignment condition in which a bottom of the movable object touches an edge of the immovable object, according to some embodiments. The movable object i.e. the object 103 is tilted to left direction, where tilts in an opposite direction are symmetric. The gripper 104 of the robotic arm 101 is holding the object 103 such that a centerline 700 of the object 103 is at an angle to a centerline 701 of immovable object i.e. the hole of the object 112. An applied force 703 at the wrist 102 of the robot 150 is sensed by means of the force sensor 105 mounted the wrist 102 of the robot 150. A twisting moment 704 is sensed at the wrist 102 due to the force 703. The twisting moment 704 is the product of the force 703 and an arm of that force 705. The arm of the force 705 is a distance from a contact point to direction of the force 703. Therefore, the sensed twisting moment 704 is dependent on exactly where the bottom of the object 103 touches an edge of the hole of the object 112.

To that end, the twisting moment 704 depends on contact configuration. Additionally, another force acts on the object 103 that is generating an additional twisting moment, but is not sensed by the force sensor 105.

According to an embodiment, another force is due to weight of the gripper 104 and the object 103. The additional generated twisting moment also depends on the contact configuration. Therefore, for the object 103 alignment as shown 7A, the magnitude of the sensed twisting moment 704 depends on the contact configuration, which in its turn depends on an amount of misalignment.

FIG. 7B illustrates the displacements in an alignment condition in which an edge of the movable object 103 touches a surface 706 on a side of the immovable object 112, according to some embodiments. A centerline 708 of the object 103 is at an angle to a centerline 707 of immovable object i.e. the hole of the object 112. Here, for the alignment condition shown in FIG. 7B, a sensed twisting moment at the wrist does not depend on exactly where the edge of the object 103 touches the surface 706 on the side of the hole of the object 112. However, regardless of the contact point, the sign of the twisting moment is the same, and opposite to that of the alignment in FIG. 7A. Thus, for such twisting moments, a correction step of constant size in positive x direction may be learned to improve the alignment of the object 103 shown in FIG. 7B.

Figure 7C:
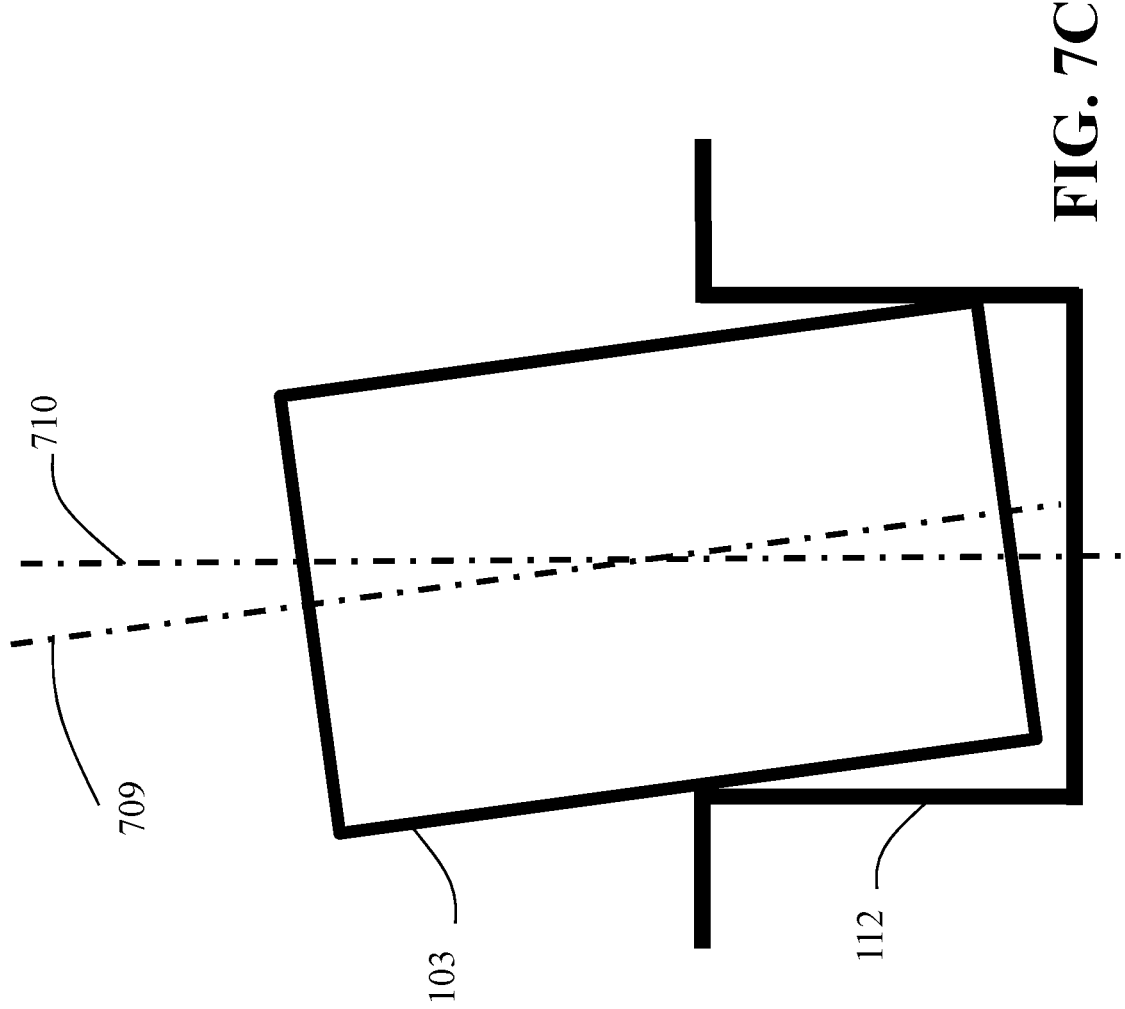
FIG. 7C illustrates the displacements in an alignment condition in which the movable object is in the immovable object, according to some embodiments.

FIG. 7C illustrates the displacements in an alignment condition in which the movable object 103 is in the immovable object 112, according to some embodiments. A centerline 709 of the object 103 is at an angle to a centerline 710 of immovable object i.e. the hole of the object 112. Here, a sensed twisting moment depends on how far the object is i.e. its z coordinate, and a misalignment angle. In such a case, the inverse mapping between the sensed twisting moment and a rotation that is to be applied to improve the alignment is learned.

Figure 8:
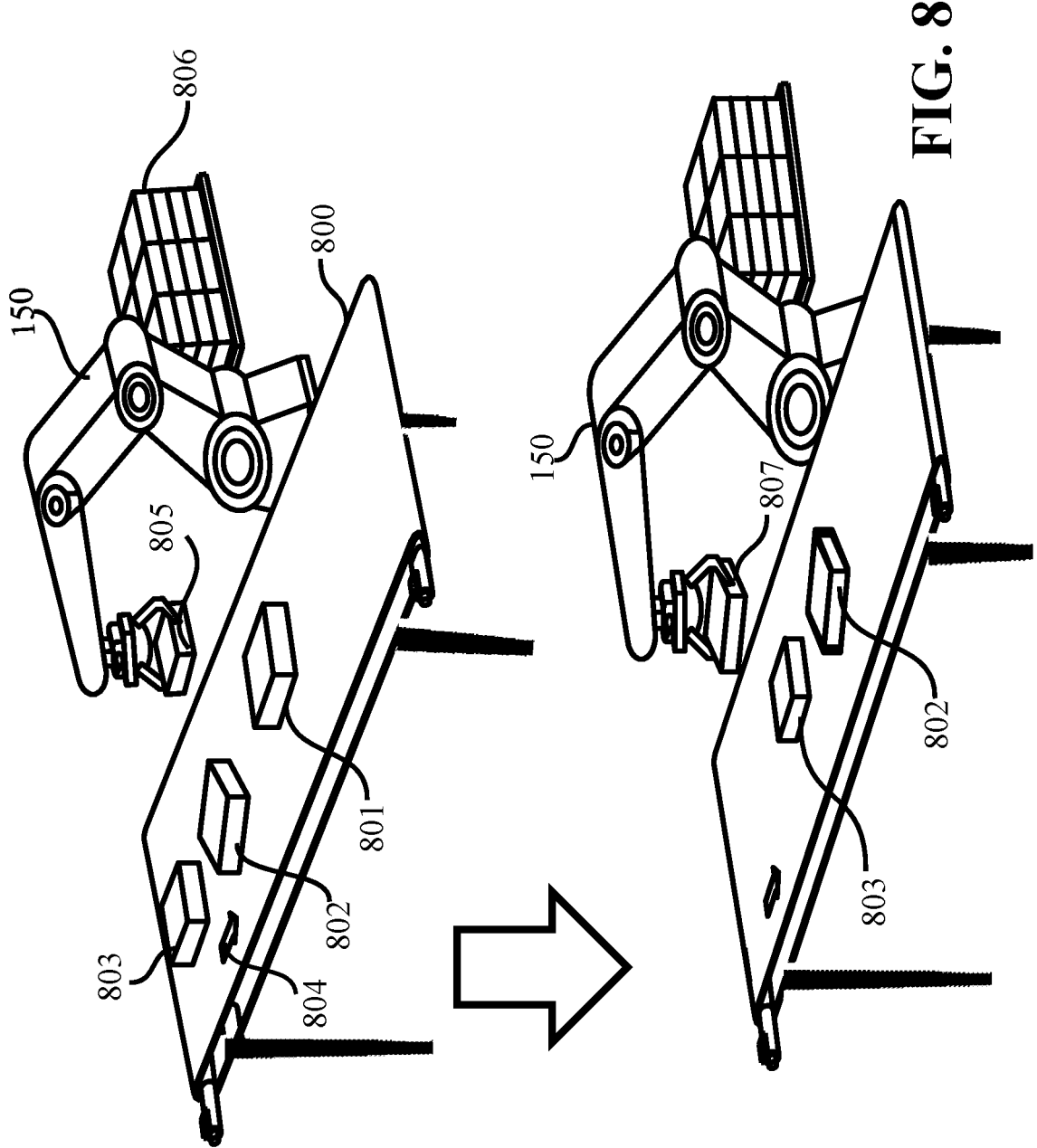
FIG. 8 illustrates the robot configured to perform the assembly operation in an industrial setup, according to some embodiments.

FIG. 8 illustrates the robot 150 configured to perform the assembly operation in an industrial setup, according to some embodiments. The industrial setup includes a conveyer belt 800 configured to move one or more objects such as empty boxes 801, 802, and 803 in a direction 804. The robot 150, via the robotic arm 101, is configured to grasp an object from a stack 806 and insert it in the objects moving on the conveyer belt 800, successively. For example, the robotic arm 101 may grasp object 805 from the stack 806 and insert it in the empty box 801. The robot 150 performs such assembly operation according to a trajectory defined according to a start pose and/or goal pose. To that end, the robotic arm 101 may be controlled based on the control law.

Further, the robotic arm 101 may grasp the object 807 from the stack 806 to insert the object 807 in the empty box 802. Since orientation of the empty box 802 is different from the empty box 801, the start pose and/or the goal pose changes. The processor 305 of the robot 150 is configured to transform the trajectory according to the changed start pose and/or the goal pose to produce a transformed trajectory, without any additional assembly specific programming. Further, the control law may be updated based on the transformed trajectory and the robotic arm 101 may be controlled in accordance with the updated control law. Accordingly, the robot 150, via the robotic arm that is controlled based on the updated control law, performs the assembly operation according to the transformed trajectory to insert the object 807 into the empty box 802. Since the transformed trajectory is produced without any additional assembly specific programming, high cost of deploying and re-tooling of robotic devices for a new assembly operation is eliminated. Therefore, the robot 150 can execute different assembly operations with variable positions of objects to be assembled without operation-specific programming.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A robot, comprising:
a robotic arm including an end-tool having a motion with multiple degrees of freedom, wherein, during an operation of the robot, a force sensor is arranged to produce measurements indicative of force experienced by the end-tool of the robotic arm during the operation;
a plurality of motors configured to change a motion of the robotic arm according to a command produced according to a control law;
at least one processor; and memory having instructions stored thereon that, when executed by the at least one processor, cause the processor, upon receiving data indicative of an original trajectory for the motion of the robotic arm transitioning a pose of the end-tool from a start pose to a goal pose to perform an assembly operation, to:
    determine the control law for controlling the plurality of motors to move the robotic arm according to the original trajectory;
    execute a self-exploration program that explores a space of the original trajectory by controlling the plurality of motors according to the control law while introducing different displacements from the original trajectory into a state of the robotic arm and registering, upon detecting the force experienced by the end-tool of the robotic arm, a pair of a measurement of a force sensor and a corresponding value of a displacement from the original trajectory to produce training data indicative of the space of the original trajectory;
    learn, using the training data, a non-linear compliant control law including a non-linear mapping that maps the measurements of the force sensor to a direction of corrections to the original trajectory defining the control law;
wherein the instructions executed by the at least one processor, further cause the processor, upon receiving an end-pose modification of the original trajectory including at least one or combination of a new start pose of the end-tool of the robotic arm and a new goal pose of the end-tool measured with an accuracy less than an accuracy of the assembly operation, to:
    transform the original trajectory according to the end-pose modification to produce a transformed trajectory;
    update the control law according to the transformed trajectory to produce an updated control law; and command the plurality of motors to control the robotic arm according to the updated control law corrected with the non-linear compliant control law learned for the original trajectory.

2. The robot of claim 1, wherein, during the self-exploration program, the processor is further configured to minimize the force experienced by the end-tool of the robotic arm based on a linear complaint law with a diagonal matrix.

3. The robot of claim 2, wherein elements of the diagonal matrix are based on a safe maximum force applicable in different directions.

4. The robot of claim 1, wherein the different displacements introduced from the original trajectory into the state of the robotic arm are symmetric or random.

5. The robot of claim 2, wherein the processor is further configured to compute a series of commanded target positions at discrete time instants for execution of the linear complaint law, wherein the processor is further configured to compute the commanded target position at a time instant based on a displacement introduced from the original trajectory into the state of the robotic arm at the time instant, a position of the end-tool at the time instant, and a velocity profile corresponding to the original trajectory.

6. The robot of claim 1, wherein the processor is further configured to apply a supervised machine learning method on the training data to learn the non-linear compliant control law.

7. The robot of claim 1, wherein the original trajectory is in a form of dynamic movement primitives (DMP) including ordinary differential equations (ODE) accepting values of the start pose and the goal pose as inputs, and wherein the processor is further configured to submit the end-pose modification into the DMP of the original trajectory to produce the transformed trajectory.

8. The robot of claim 1, wherein the non-linear mapping is trained to produce a direction of the corrections scaled according to a predetermined magnitude of the corrections.

9. The robot of claim 1, wherein the non-linear mapping is trained to produce a direction of the corrections scaled based on a velocity of the end-tool.

10. The robot of claim 1, wherein the end-pose modification is accepted from one or more imaging devices.

11. The robot of claim 10, wherein the one or more imaging devices include an industrial vision camera with an accuracy on the order of 1 mm, while a tolerance of an accuracy of the operation of the robot is on an order of 0.1 mm.

* * * * *